United States Patent [19]

Foster et al.

[11] Patent Number: 5,588,522
[45] Date of Patent: Dec. 31, 1996

[54] RECIPROCATING FLOOR CONVEYOR FOR CONVEYING PALLETIZED LOADS OR THE LIKE

[75] Inventors: Raymond K. Foster; Randall M. Foster, both of Madras, Oreg.

[73] Assignee: Raymond Keith Foster, Madras, Oreg.

[21] Appl. No.: 327,630

[22] Filed: Oct. 24, 1994

[51] Int. Cl.⁶ ..................................................... B65B 25/00
[52] U.S. Cl. ...................... 198/775; 414/525.1
[58] Field of Search .................. 198/775, 774.2, 198/751, 955, 809; 414/525.1, 525.9

[56] References Cited

U.S. PATENT DOCUMENTS

| | | | |
|---|---|---|---|
| 788,640 | 5/1905 | Goodman | 198/775 |
| 1,964,297 | 6/1934 | Moser et al. | 198/775 |
| 2,010,295 | 8/1935 | Dreffein | 198/775 |
| 2,973,856 | 3/1961 | Brooks | 198/219 |
| 3,815,726 | 6/1974 | Klein | 198/751 |
| 3,905,290 | 9/1975 | Caughey | 100/215 |
| 4,353,457 | 10/1982 | Halely | 198/774.2 |
| 4,395,183 | 7/1983 | Wirholm et al. | 414/416 |
| 4,511,030 | 4/1985 | Lem | 198/955 |
| 4,580,678 | 4/1986 | Foster | 198/751 |
| 4,679,686 | 7/1987 | Foster | 198/750 |
| 4,709,805 | 12/1987 | Foster | 198/750 |
| 4,711,342 | 12/1987 | Abraham | 198/775 |
| 4,712,467 | 12/1987 | Foster | 91/176 |
| 4,748,894 | 6/1988 | Foster | 91/176 |
| 4,896,761 | 1/1990 | Foster | 198/750 |
| 4,962,848 | 10/1990 | Foster | 198/750 |
| 5,088,595 | 2/1992 | Hallstrom, Jr. | 198/750 |

OTHER PUBLICATIONS

Two pages from a French catalog, dated Sep. 1992 (with translation) PowerTrax Catalog page.

*Primary Examiner*—Joseph E. Valenza
*Attorney, Agent, or Firm*—Joan H. Pauly; David P. Campbell

[57] ABSTRACT

A reciprocating floor conveyor (10) including a support frame (12), and a conveyor floor (14), which is comprised of a plurality of laterally spaced-apart conveyor slats (16), a plurality of laterally spaced-apart holding slats (18), and a series of divider planks (20). Divider planks (20) are fixedly secured to the upper portion of support framework (12). Conveyor slats (16) are mounted on support frame (12) for longitudinal reciprocation between "start" and "advanced" positions. Holding slats (18) are mounted on support frame (12) for vertical movement between an "up" position in which the holding slats (18) are above the conveyor slats (16), and a "down" position, in which the holding slats (18) are below the conveyor slats (16). The load is conveyed by lowering the holding slats (18), advancing the conveyor slats (16), to convey the load, raising the holding slats and retracting the conveyor slats to their "start" position, and repeating the process.

20 Claims, 16 Drawing Sheets

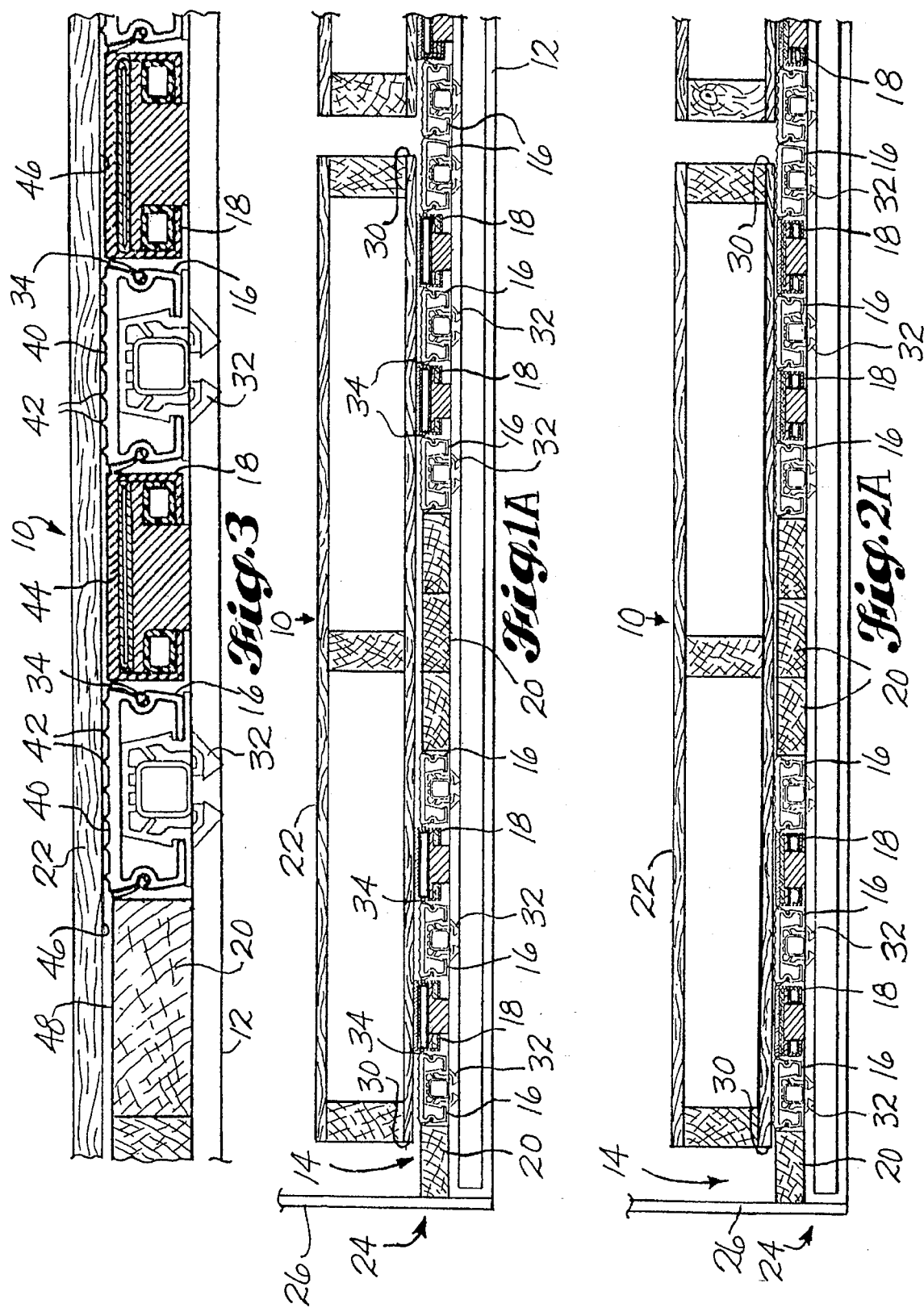

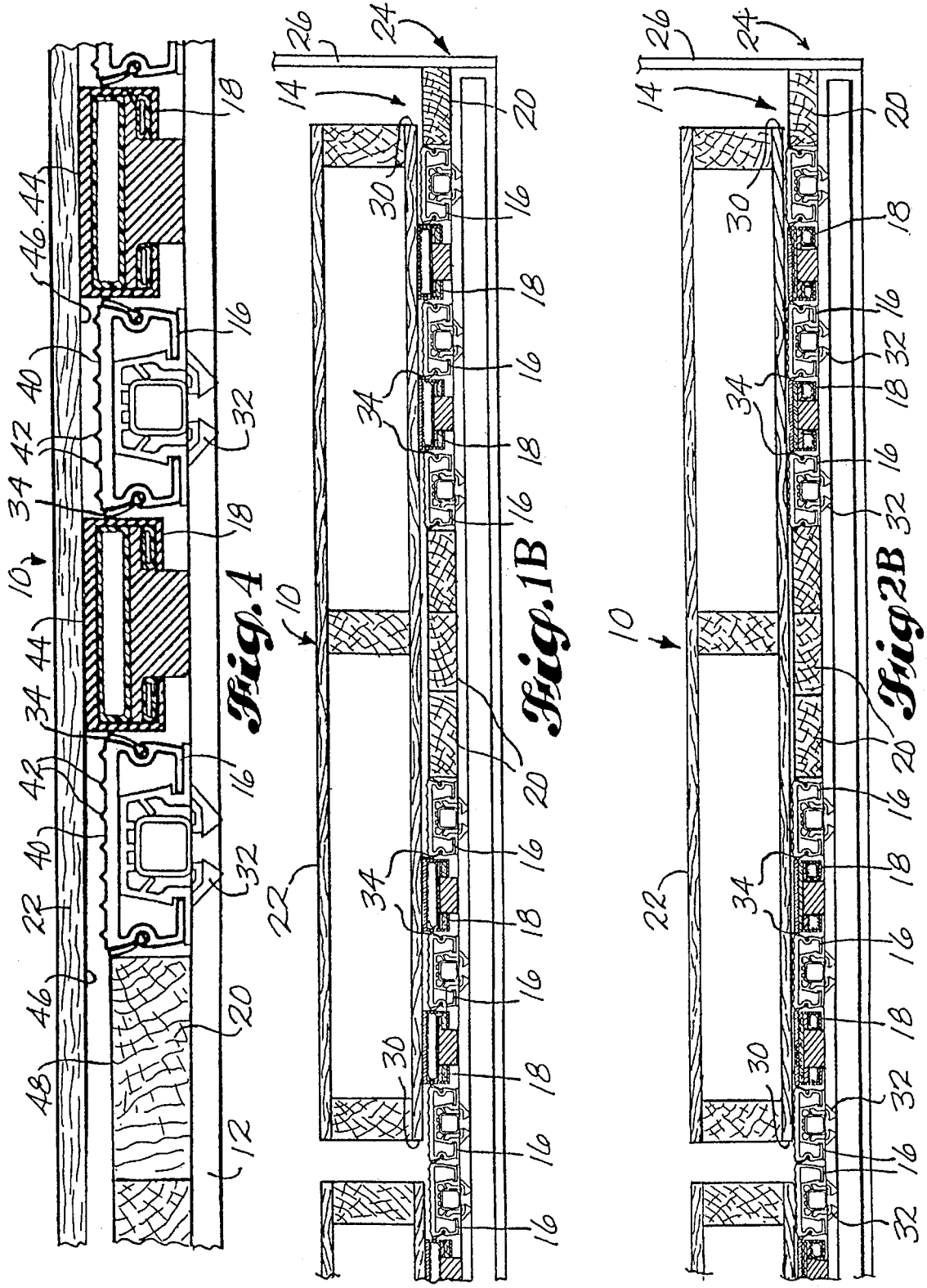

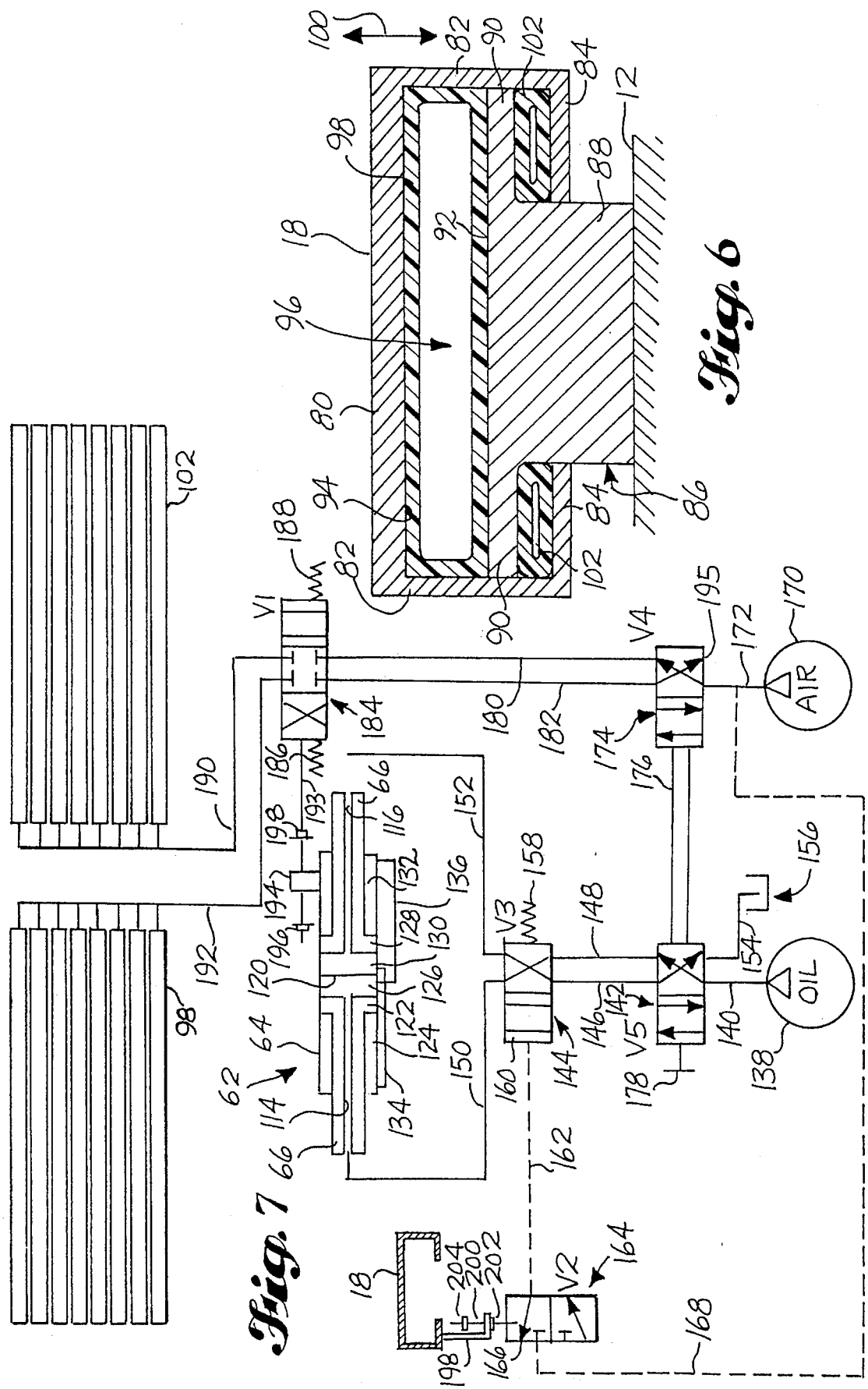

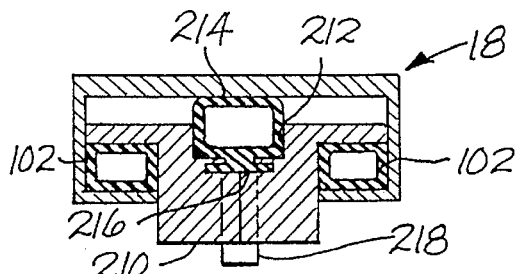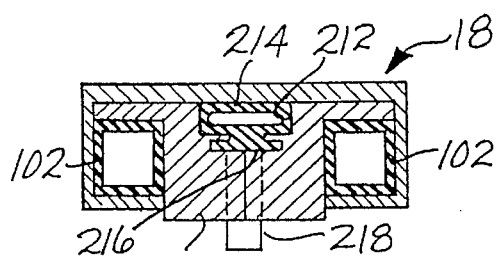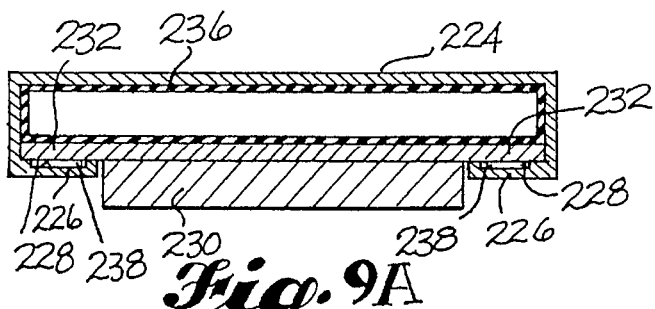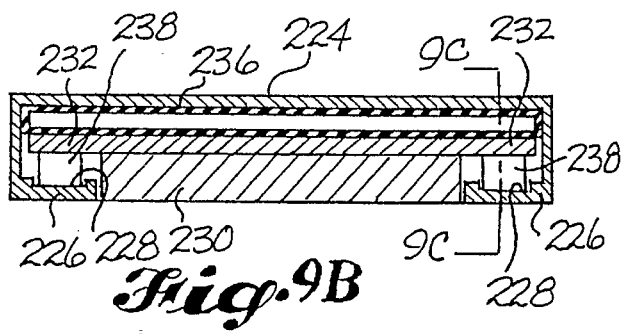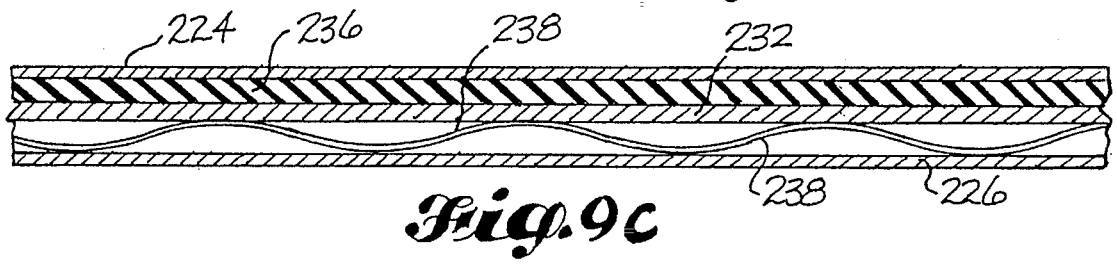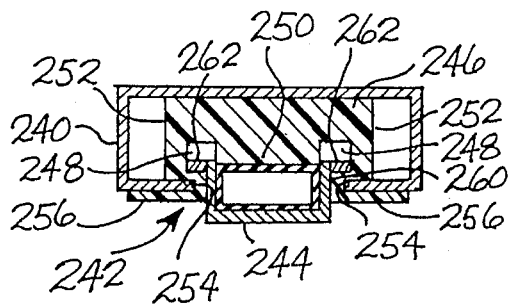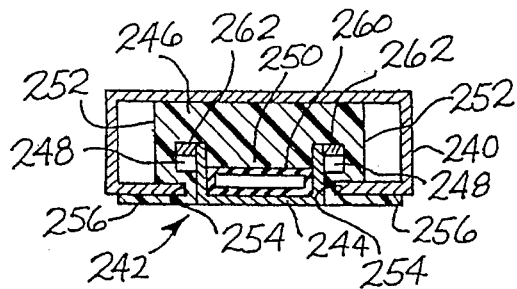

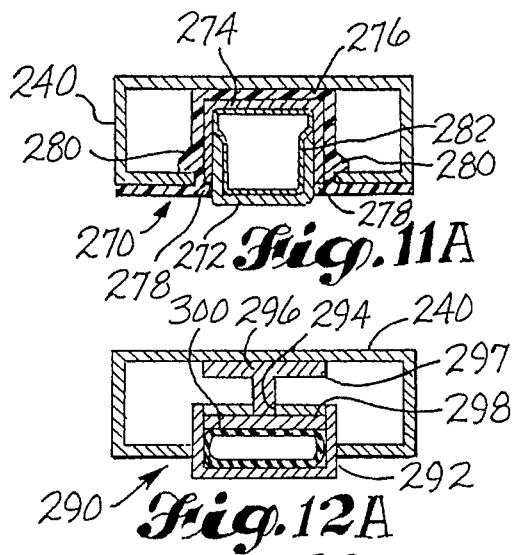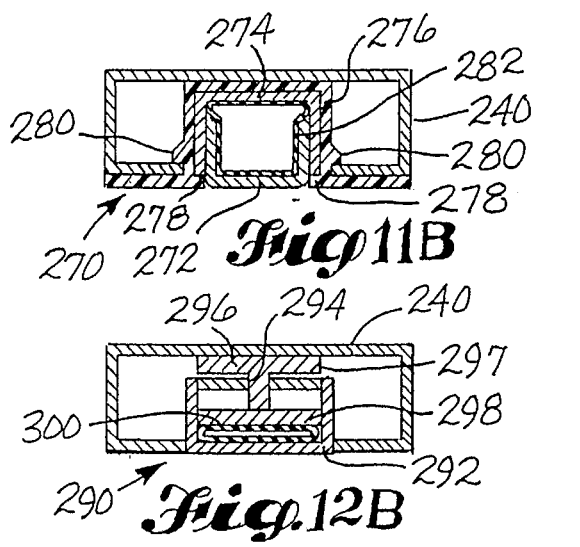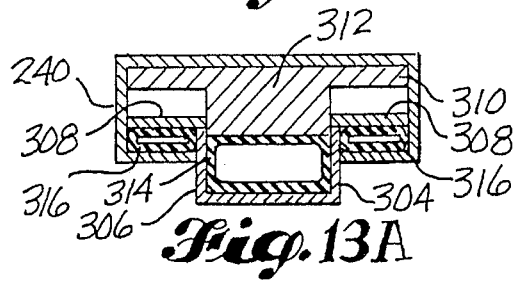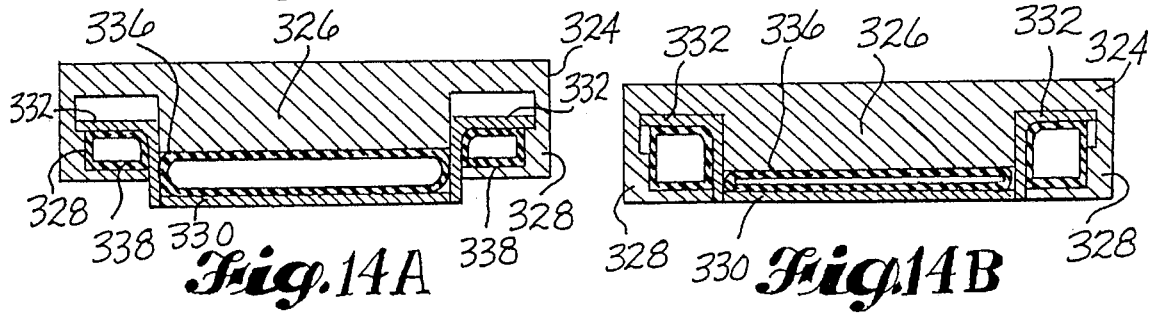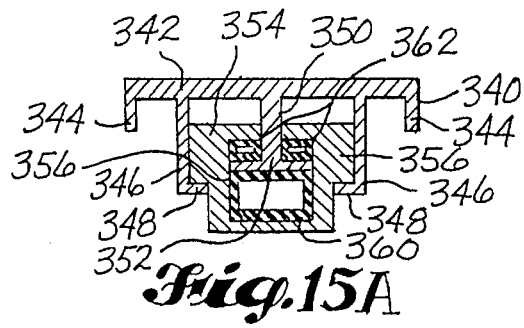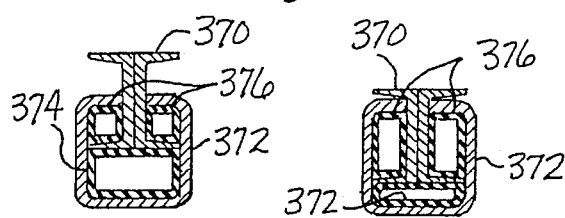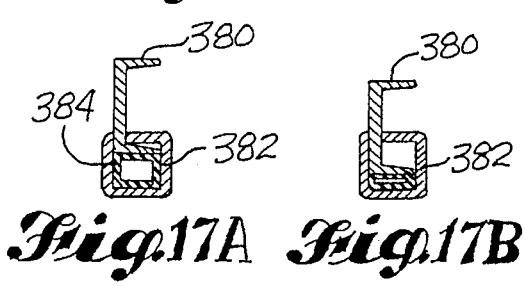

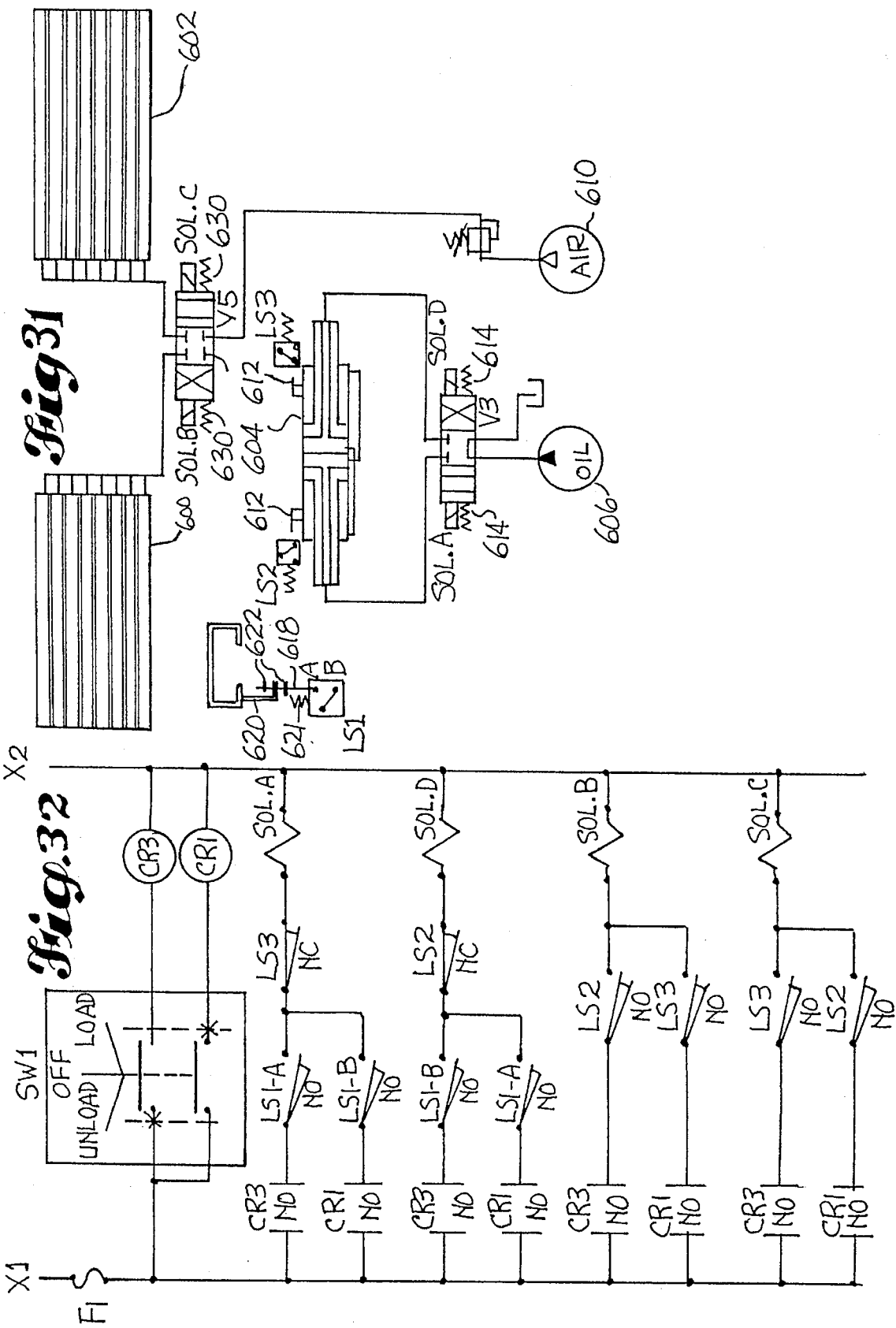

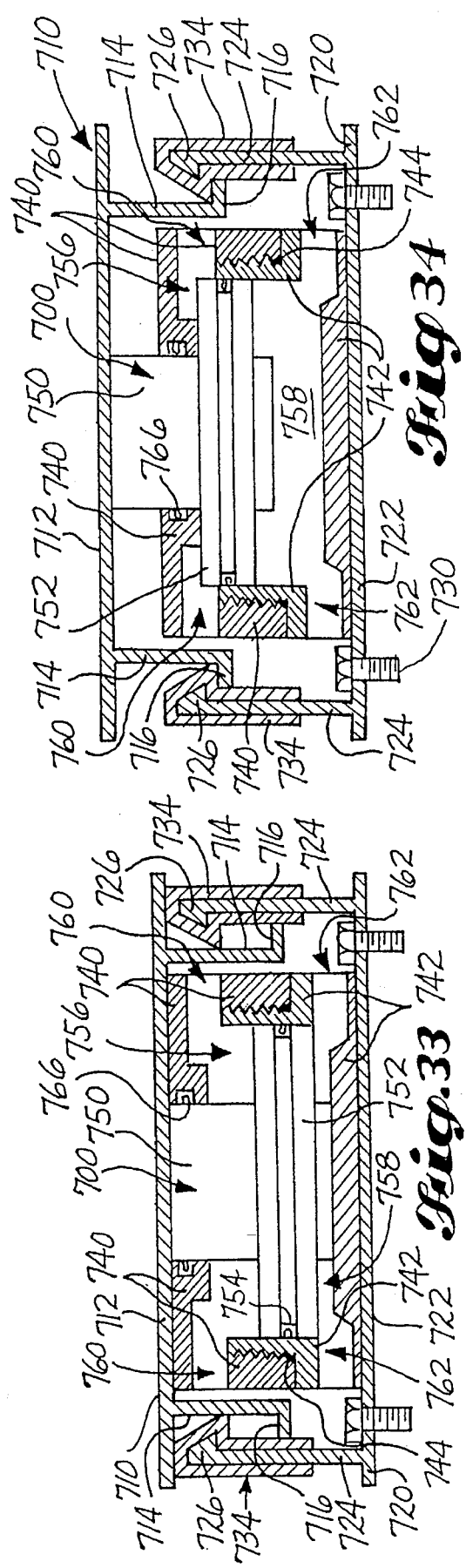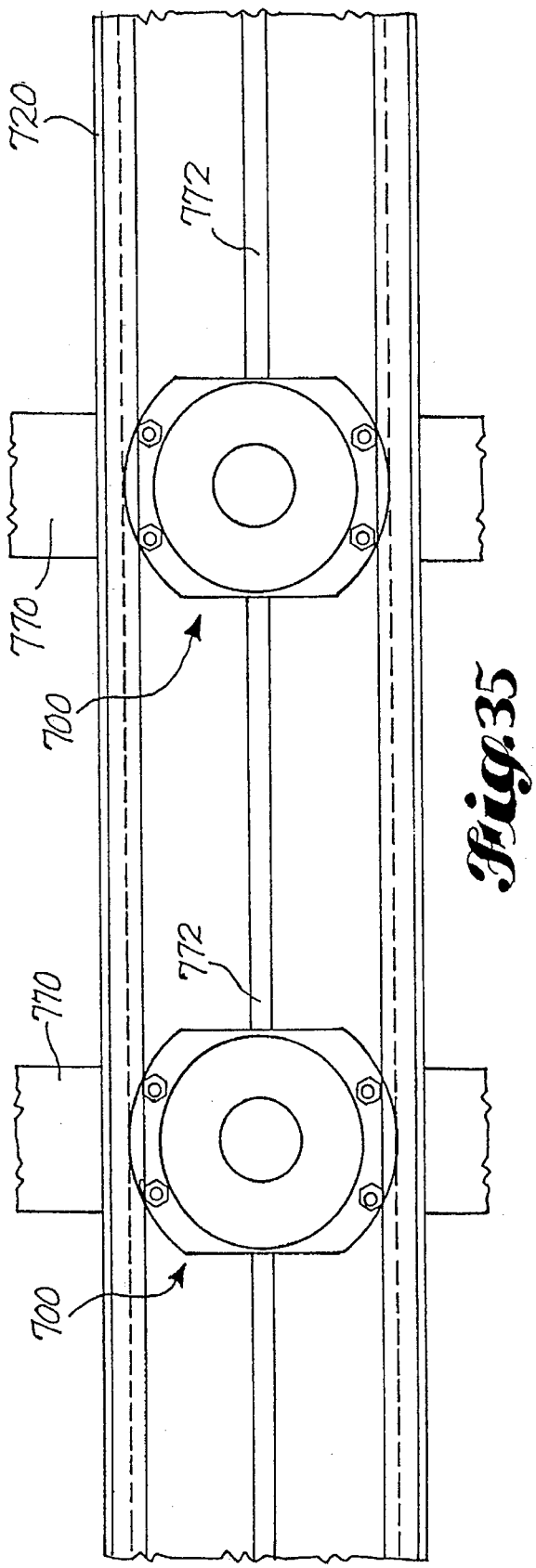

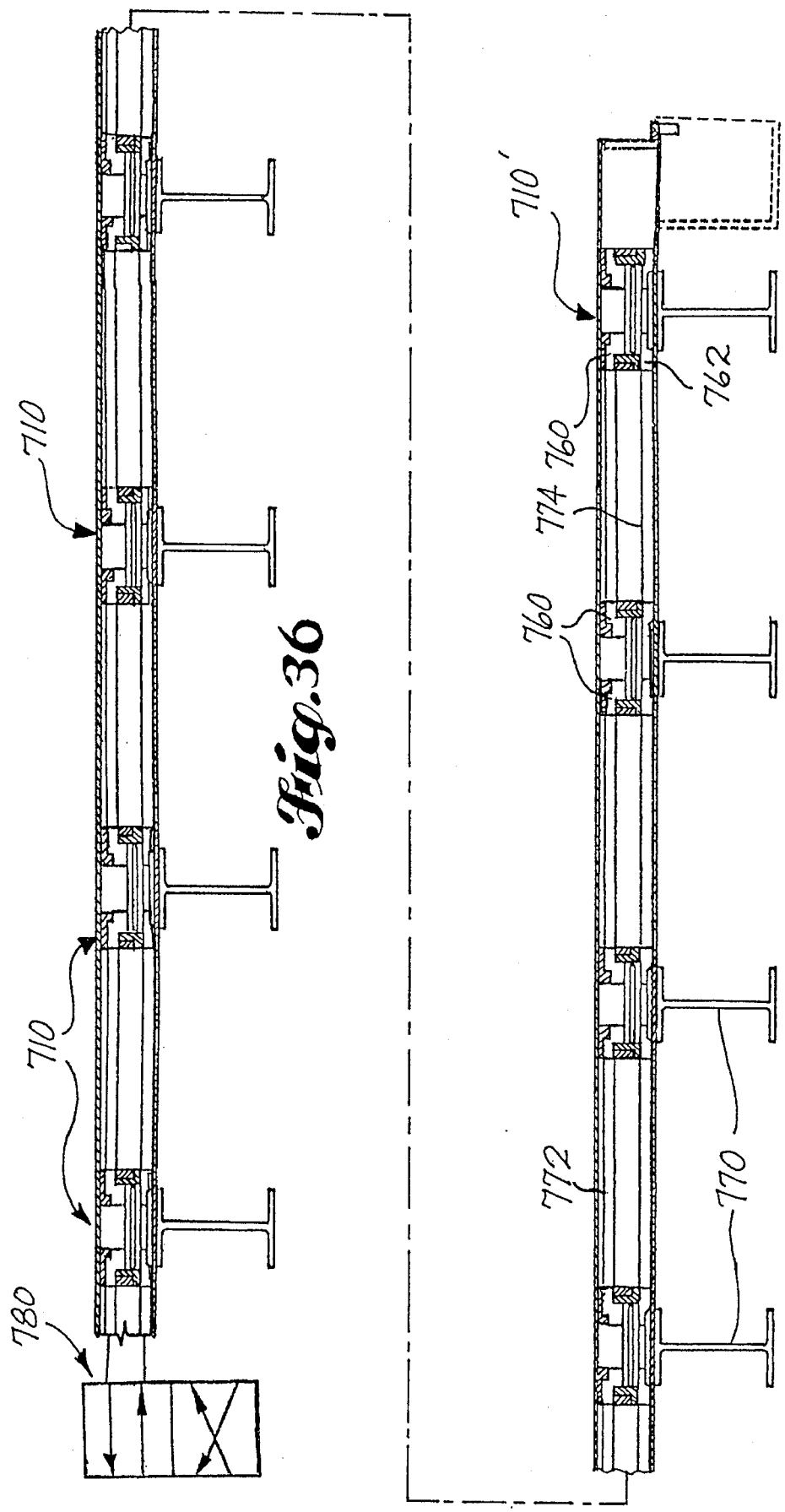

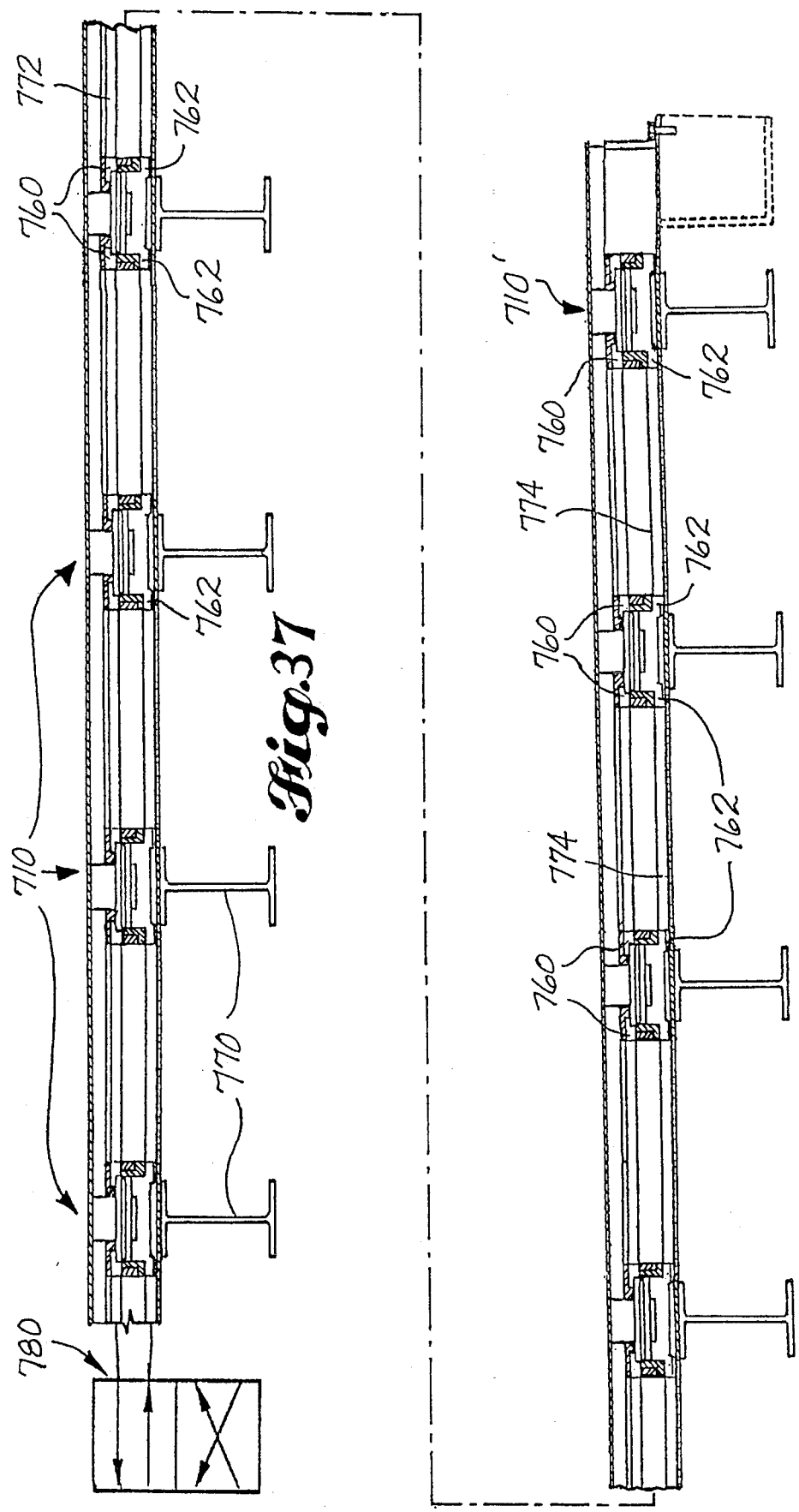

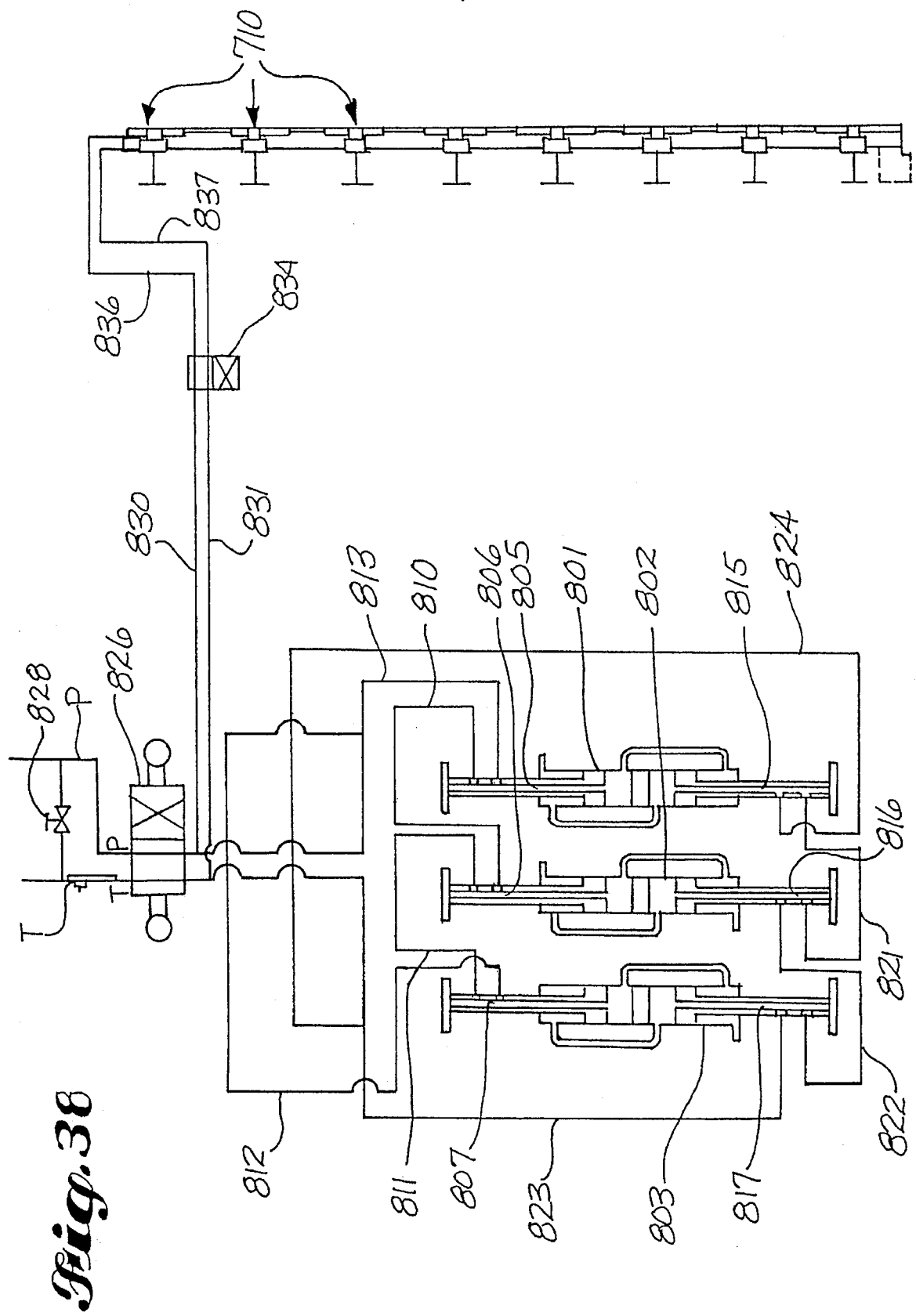

RECIPROCATING FLOOR CONVEYOR FOR CONVEYING PALLETIZED LOADS OR THE LIKE

TECHNICAL FIELD

This invention pertains to reciprocating floor conveyors of the type having a plurality of movable slats for conveying a load and, more particularly, to a reciprocating floor conveyor having a set of slats for conveying a load and a second set of slats for lifting and holding the load while the set of conveying slats retract.

BACKGROUND OF THE INVENTION

Reciprocating floor conveyors having a plurality of movable slats for conveying a load are now generally well known. They are used in a variety of applications and for conveying many different types of loads. Examples of reciprocating floor conveyors are disclosed in U.S. Pat. No. 3,905,290, of Caughey, granted Sep. 16, 1975; U.S. Pat. No. 4,709,805, of Foster, granted Dec. 1, 1987; and U.S. Pat. No. 5,088,595, of Hallstrom, Jr., granted Feb. 18, 1992.

It has been discovered that reciprocating floor conveyors do not always function well when conveying palletized loads. With palletized loads, the pallets do not always remain balanced with their weight evenly distributed on the slats. The movable slats of a conveyor contact the bottom of the pallets at various contact points about the pallets, rather than uniformly across the bottom surface of the pallets. Unfortunately, the contact points are not always evenly distributed across the conveyor slats. As a result, the advancing conveyor slats do not always advance the pallets in a uniform manner, and the retracting conveyor slats sometimes catch the pallets and rotate them. This can cause the load to become stuck or blocked on the conveyor. Consequently, reciprocating floor conveyors do not always convey palletized loads in a reliable and controlled manner.

With non-palletized loads, such as bulk material and garbage, the distribution of the load remains relatively uniform across the conveyor slats and, thus, the conveyor slats can function to convey the load in a uniform, controlled manner. However, with palletized loads, especially with older, used pallets, which can become bent or warped, the pallets contact the movable slats at certain points non-uniformly distributed about the slats. As a result, the basic concept of reciprocating floor conveyors with movable slats—having more slats conveying the load than slats being retracted—does not always work to convey pallets and other similar type loads with fixed-form wide bases.

Accordingly, it is an object of the present invention to address the problems associated with conveying palletized loads or the like using reciprocating floor conveyors having a plurality of movable slats.

SUMMARY OF THE INVENTION

Briefly described, in a first embodiment, the reciprocating floor conveyor of the present invention comprises a support frame, a plurality of laterally spaced-apart conveyor slats mounted on the support frame for longitudinal reciprocation between "start" and "advanced" positions. The reciprocating floor conveyor also includes a plurality of laterally spaced-apart holding slats mounted on the frame for vertical movement between an "up" position, in which the holding slats are above the conveyor slats, and a "down" position in which the holding slats are below the conveyor slats. The conveyor slats and the holding slats are distributed across the conveyor in a pattern resulting in both conveyor slats and holding slats being below each article on the conveyor. A drive unit is provided for moving the conveyor slats and any article on them from the "start" position to the "advanced" position, when the holding slats are in their "down" position. The drive unit also retracts the conveyor slats when the holding slats are in their "up" position and are holding the articles up off the conveyor slats.

The conveyor slats are mounted on the support frame so that their movement is restricted solely to longitudinal reciprocation, and the holding slats are mounted on the support frame so that their movement is restricted solely to vertical movement. In this manner, separate drive units control the movement of the conveyor slats and the holding slats. Such a design simplifies the operation of the reciprocating floor conveyor.

The holding slat support assemblies can be designed in many different ways. For one design, a holding slat base is provided for each holding slat. An expandable member such as an inflatable lifting tube is provided between each holding slat and its holding slat base. Expansion of the lifting tube raises the holding slats away from the holding slat bases and from their "down" positions to their "up" positions. Between each holding slat and its holding slat base, a collapsible pocket is formed in which the expandable member is located.

According to an aspect of this design for the holding slats, each holding slat includes a top, and a sidewall extending downwardly from the top, the sidewall adapted to engage its holding slat base and keep the holding slat aligned on the holding slat base. The sidewall also provides lateral support for the expandable member.

According to another aspect of the invention, a second pair of expandable members are provided beneath the holding slat base and a pair of bottom flanges extending inwardly from the sidewalls of the holding slat. Expansion of the second expandable members causes the holding slat to move downwardly. Other holding slat arrangements are provided as examples of alternative designs for the holding slats.

According to an aspect of the invention, a control arm is provided extending downwardly from one of the holding slats and a control rod is provided adjacent the control arm. The control rod controls the direction of movement of the conveyor slats. The control rod includes a pair of spaced abutments in the path of movement of the control arm. The control arm is adapted to shift the control rod between a first and second position by contacting the abutments as the holding slat moves between its "up" and "down" positions.

These and other objects, advantages, and features of the present invention will become apparent from the following description of the best mode of the invention, and the accompanying drawings, and the claims, which are incorporated herein by reference.

BRIEF DESCRIPTION OF THE DRAWINGS

In the figures, like reference numerals refer to like parts throughout the several views, wherein:

FIGS. 1A and 1B are sectional views shown partially in cross-section of the reciprocating floor conveyor of the present invention, with the holding slats shown in a raised position supporting pallets;

FIGS. 2A and 2B are views similar to FIGS. 1A and 1B, showing the holding slats in a lowered position wherein the conveyor slats support and convey the pallets;

FIGS. 3 and 4 are fragmentary, enlarged, detail, sectional views of the conveyor slats and holding slats of FIGS. 1A and 1B;

FIG. 6 is a cross-sectional view of a holding slat of FIGS. 1A and 1B; and

FIG. 7 is a schematic diagram illustrating the control components for operating the reciprocating floor conveyor of FIGS. 1A and 1B;

FIGS. 8A–17B show alternate embodiments for the holding slat arrangement of FIG. 6;

FIG. 31 is a slightly modified version of the control system of FIG. 29; and

FIG. 32 is a circuit diagram for the control system of FIG. 31.

FIG. 33 is a sectional view of an alternative holding slat lifting mechanism comprising a pancake piston/cylinder design;

FIG. 34 is a sectional view of the lifting mechanism of FIG. 33 shown with the holding slat in a raised position;

FIG. 35 is a partial plan view of a pair of pancake pistons mounted at cross beam locations;

FIGS. 36 and 37 are schematic views of a linked series of pancake pistons, with a holding slat in a lowered and raised position, respectively, and also shown with a switching valve controlling pressure flow to the pancake pistons;

FIG. 38 is a control diagram for the alternative hydraulic lifting mechanism design of FIGS. 33–37.

BEST MODE FOR CARRYING OUT THE INVENTION

Figure 5:
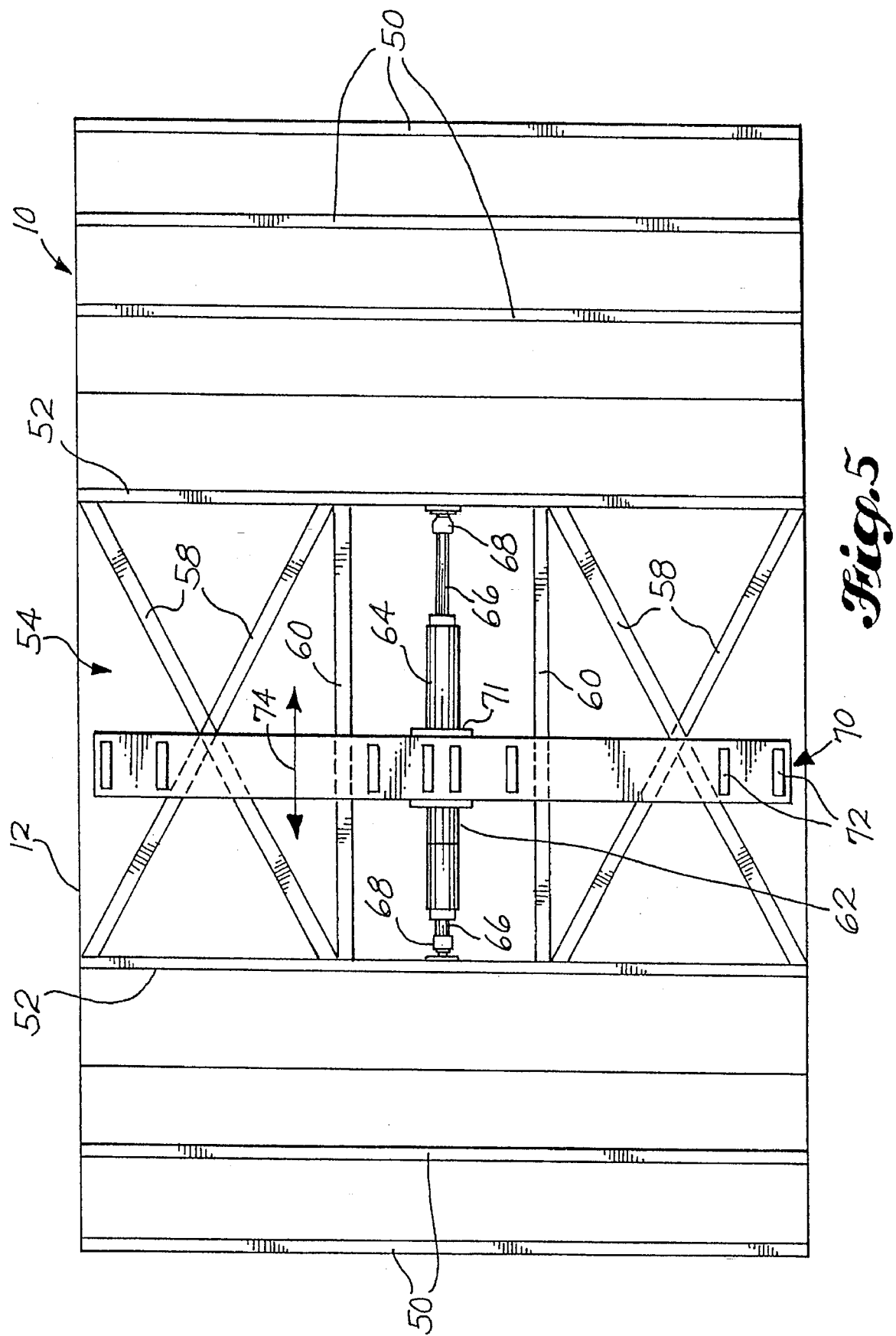
FIG. 5 is a plan view of the support structure and conveyor drive mechanism for reciprocating the conveyor slats of FIGS. 1A and 1B.

In FIGS. 1A and 1B, the reciprocating floor conveyor 10 of the present invention is shown to include a support frame 12 extending transversely of the conveyor 10. Support frame 12 supports a conveyor floor 14, which comprises a plurality of laterally spaced-apart conveyor slats 16, a plurality of laterally spaced-apart holding slats 18, and a series of divider planks 20. The reciprocating floor conveyor 10 is designed to carry palletized loads and other similar type loads wherein pallets 22 or the like are utilized to handle the loads, or the articles themselves have fixed-form wide bases that span several slats.

Divider planks 20 are fixedly secured to the upper portion of support frame 12. Conveyor slats 16 are mounted on support frame 12 for longitudinal reciprocation between "start" and "advanced" positions. My prior U.S. Pat. No. 4,896,761, entitled, "Reciprocating Conveyor Floor Members and Seals," issued Jan. 30, 1990, and U.S. Pat. No. 4,679,686, entitled, "Bearing System for Reciprocating Floor conveyor," which issued Jul. 14, 1987, disclose in more detail the mounting arrangement for slidably securing conveyor slats 16 to support frame 12. Generally, each mounting arrangement for a conveyor slat includes a longitudinal 1"×1" guide beam mounted on support frame 12. A series of bearings 32 snap onto guide beams. Seal strips 34 are held in grooves along sidewalls of slats 16 and extend laterally outwardly to engage adjacent holding slats 18.

Holding slats 18 are mounted on support frame 12 for vertical movement between an "up" position, as shown in FIGS. 1A and 1B, in which the holding slats 18 are above the conveyor slats 16, and a "down" position in which the holding slats 18 are below the conveyor slats 16. Holding slats 18 are discussed in more detail later. Accordingly, it can be seen that conveyor slats 16 and holding slats 18 are distributed across the conveyor floor 14 in a pattern that results in both conveyor slats 16 and holding slats 18 being below each article on the conveyor.

Divider planks 20 preferably are made of wood, and conveyor slats 16 and holding slats 18 are made of aluminum or other lightweight material, such as plastic. A typical installation for the reciprocating floor conveyor 10 of the present invention would be in a container 24 mounted on a trailer bed (not shown). Container 24 would include sidewalls 26, an end wall, and rear end trailer doors for enclosing the load. See FIG. 1 of my '686 patent. Conveyor slats 16 and holding slats 18 would extend longitudinally the length of the container 24. My prior U.S. Pat. No. 4,709,805, entitled, "Drive/Frame Assembly for Reciprocating Floor Conveyor," which issued Dec. 1, 1987, and U.S. Pat. No. 4,962,848, entitled, "Reciprocating Floor Conveyor," which issued Oct. 16, 1990, disclose representative installations of reciprocating floor conveyors.

Pallets 22 can be any in a series of standardized pallet designs constructed of, for example, corrugated paper board, structural plastic, or wood, as shown in the figures. Pallets 22 include a fixed-form wide base 30 that spans across more than one conveyor slat 16 and, more particularly, spans four or more conveyor slats 16, as shown in the figures. Alternatively, the articles conveyed by the conveyor could be boxes or other types of shipping containers having fixed-form wide bases. Also, the articles could include certain types of bulk material, such as hay or straw, that tends to interlock to form a somewhat solid-like structure.

Divider planks 20 are provided along conveyor floor 14 because it is not always necessary that conveyor slats 16 and holding slats 18 span the entire surface of conveyor floor 14. However, divider planks 20 could be omitted. With palletized loads having fixed-form wide bases, it becomes practical to provide only a few conveyor slats and holding slats for each pallet size, with at lease two spaced conveyor slats and two spaced holding slats for each pallet. Alternatively, the entire conveyor floor 14 could be spanned by slats, which arrangement may become necessary for smaller-sized pallets or solid-like bulk material.

FIGS. 2A and 2B are views like FIGS. 1A and 1B, except that in FIGS. 2A and 2B, holding slats 18 are shown in their lowered position wherein holding slats 18 are below conveyor slats 16 and, accordingly, pallets 22 are supported by the conveyor slats 16.

In FIG. 3, the upper surface 40 of each conveyor slat 16 includes ridges 42. The upper surfaces 44 of holding slats 18 are smooth. This upper surface design works well for wooden pallets, but may not be necessary for other types of articles. As shown in FIG. 3, holding slats 18 are in their lowered or "down" position and the upper surfaces of ridges 42 are above upper surfaces 44 of holding slats 18. Accordingly, the bottom surface 46 of pallet 22 contacts ridges 42 and is spaced from surfaces 44 of holding slats 18. In the position shown in FIG. 3, conveyor slats 16 are in position to move from their "start" position to their "advanced" position and thereby convey pallets 22 along the reciprocating floor conveyor.

In FIG. 4, holding slats 18 are shown in their raised or "up" position. In this position, surfaces 44 of holding slats 18 contact the bottom surface 46 of pallet 22 and raise pallet 22 and its load above ridges 42 of conveyor slats 16. In this position, conveyor slats 16 are in position to be retracted from their "advanced" position to their "start" position. In both FIGS. 3 and 4, it can be seen that the upper surface 48 of each divider plank 20 is below upper surface 40 of conveyor slats 16 so that upon lowering holding slats 18, pallets 22 are supported on conveyor slats 16 and spaced from divider planks 20. With this arrangement, divider planks 20 offer no resistance to movement of pallets 22.

In FIG. 5, support frame 12 is shown to include transverse frame members 50, including inner transverse frame members 52. Transverse frame members 50, 52 are mounted on longitudinal beams (not shown) and support the conveyor slats and holding slats. Inner transverse frame members 52 define a window 54 beneath the conveyor floor (not shown) of the reciprocating floor conveyor 10. Window 54 is spanned by cross braces 58 and inner longitudinal braces 60. A drive unit in the form of a hydraulic actuator motor 62 is positioned longitudinally between inner transverse frame members 52 and inner longitudinal braces 60. Actuator motor 62 is disclosed in more detail in my prior U.S. Pat. No. 4,712,467, entitled, "Combined Linear Hydraulic Motor and Transfer Valve," issued Dec. 15, 1987, and U.S. Pat. No. 4,748,894, entitled, "Drive/Frame Assembly for a Reciprocating Floor," which issued Jun. 7, 1988. Generally, hydraulic actuator 62 includes a movable cylinder unit 64 and a pair of separate fixed piston rods 66 extending from each end of the cylinder unit 64. The ends 68 of piston rods 66 are secured to the inner transverse frame members 52.

A transverse drive beam 70 is mounted to movable cylinder 64 by means of mounting block 71. Mounting shoes 72 are utilized to secure transverse drive beam 70 to each of the conveyor slats 16. Actuator motor 62 reciprocates transverse drive beam 70 in the direction of arrow 74. This, in turn, reciprocates the conveyor slats longitudinally along the conveyor. As shown in FIG. 5, a single hydraulic actuator 62 is provided for moving the transverse drive beam 70. Alternatively, however, two or more hydraulic motors, like motor 62, could be provided and mounted between inner transverse frame members 52 laterally spaced in parallel relationship from one another and each secured to the transverse drive beam 70.

It should be noted that, in addition to providing more than one hydraulic actuator, more than one transverse drive beam can be provided, as well. The movable conveyor slats can be divided into sets of slats, with each set connected to its own transverse drive beam. Separate actuators would control movement of the transverse drive beams, in a manner known in the art, wherein the sets of the movable slats move forward in unison to convey the load, with the holding slats lowered, and retract separately, with the holding slats raised.

Alternatively, the drive system for conveying the slats can be forward mounted at the front of the reciprocating floor conveyor. As disclosed in my prior issued U.S. Pat. No. 5,096,356, entitled "Reciprocating Floor Conveyor in a Receptacle for a Liquid Laden Material," issued Mar. 17, 1992, the drive assembly is positioned at one end of the conveyor, and a bulkhead is positioned therebetween. Drive rods extend through the bulkhead to connect to the conveyor slats. Such an arrangement is feasible for the present invention.

In FIG. 6, a holding slat 18, in a first embodiment thereof, is shown to include a top 80, a pair of sides 82 extending downwardly from the lateral edges of top 80, and a pair of bottom flanges 84 extending inwardly from the bottom edges of sides 82. Holding slat 18 is carried by a holding slat base 86. Holding slat base 86 includes a trunk 88 mounted to support frame 12 and a pair of upper lateral flanges 90. The upper surface 92 of holding slat base 86 and the inner surface 94 of holding slat 18 define a collapsible pocket 96 in which is located an expandable slat lift member 98 in the form of an elongated inflatable tube. Tube 98 extends the length of holding slat 18 and holding slat base 86. Pneumatic connections (not shown) provide pressurized air into tube 98 to inflate the tube and cause holding slat 18 to move upwardly as indicated by arrow 100 and, accordingly, to move relative to fixed holding slat base 86. As holding slat 18 moves into its "up" position, the inner surface 94 of sides 82 slide upwardly past the lateral edges of flanges 90 and provide lateral support for tube 98. Flanges 90 function in part to keep holding slat 18 aligned on base 86.

A second pair of inflatable tubes 102 are provided beneath lateral flanges 90 and above bottom flanges 84. Inflatable tubes 102, like tube 98, are connected to a pneumatic air source for providing pressurized air into tubes 102 in order to inflate the tubes and cause holding slat 18 to move downwardly. The pneumatic connections to tubes 98 and 102 are controlled in a manner so that while pressurized air is introduced into tube 98, air is vented from tubes 102, and when pressurized air is introduced into tubes 102, air is vented from tube 98. It should be noted that tubes 102 are not always necessary. Should the loads carried by the conveyor be sufficiently heavy, the weight of the loads will cause the holding slats to lower, thereby exhausting lifting tubes 98.

Referring to FIG. 7, the actuator motor 62 is shown in schematic form. Its fixed piston rods 66 are tubular and define center passageways 114, 116 for hydraulic fluid or oil. The traveling cylinder body 64 includes a center wall 120 dividing its interior into two axial sections. Piston head 122 divides its section into two working chambers 124, 126, one on each side of the piston head 122. Piston head 128 divides its section into two working chambers 130, 132, one on each side of the piston head 128. A first tube 134 connects working chamber 124 with working chamber 130. A second tube 136 connects working chamber 126 with working chamber 132. This construction of the actuator motor 62 is described in detail in my aforementioned U.S. Pat. No. 4,748,894.

A source of oil, which may consist of a storage tank, a pump, a filter, a relief valve, etc. is designated 138. A passageway 140 leads from oil source 138 to a two-position valve 142, which controls the conveying direction. A two-position switching valve 144 is connected to valve 142 by passageways 146, 148. A first passageway 150 extends from valve 144 to passageway 114. A second passageway 152 extends from valve 144 to passageway 116. Valve 144 switches pressure and return between passageways 150 and 152, and hence between passageways 114, 116. Passageways 146, 148 are either at pressure or return depending on the position of valve 142. Should more than one actuator motor 62 be utilized to move the transverse drive beam, the additional actuator motors would be connected in parallel between passageways 150, 152.

A passageway 154 leads from valve 142 back to tank 156. Passageways 150, 152, and hence passageways 114, 116, are at pressure or return depending on the position of valve 144.

Valve 144 is biased by a spring 158 into a first of its two positions. An air chamber 160 is provided at the end of valve 144 opposite the spring 158 and is connected by a passageway 162 to a valve 164. Valve 164 is shown to have two positions. In the position illustrated, valve 164 connects passageway 162 to the atmosphere at a port 166. In the second position of valve 164, an air supply line 168 is connected to the passageway 162 and thus also to the chamber 160.

A source of air pressure, e.g. an air pump, is designated 170. A passageway 172 connects source 170 to a two-position valve 174. A mechanical connection 176 connects the movable elements of valves 142, 174 so that they will move together in response to a push or pull on a handle 178. Alternatively, handle 178 could be pilot operated. Passageways 180, 182 connect valve 174 with a three-position valve 184. Valve 184 is biased into a center position, such as by springs 186, 188. An air passageway 190 connects valve 184 to the lowering tubes 102. A passageway 192 connects valve 184 to the lifting tubes 98. In the position illustrated, valve 184 blocks air flow between passageways 180, 190 and 182, 192, respectively. Valve 184 is moved back and forth between two end positions by a control rod 193, which extends through a lug 194 carried by cylinder 64. Rod 193 is provided with spaced-apart abutments 196, 198. Abutment 196 is on one side of lug 194 and abutment 198 is on the opposite side of lug 194. Lug 194 need only be mounted to one cylinder in a multi-actuator motor arrangement. In such an arrangement, it may be advantageous to provide mechanical couplers between the actuator motors to ensure uniform movement.

In operation, with valves 142, 144 in the positions illustrated, oil pressure is delivered from source 138 through passageway 140 and then through valve 142 to passageway 148. The oil pressure moves from passageway 148 through valve 144 into passageway 150. It next moves from passageway 150 into passageway 114 and then into working chamber 126. Oil pressure moves from working chamber 126 through passageway 136 into working chamber 132. In response, the cylinder body 64 moves to the right. At this time the holding slats are in a "down" position. Air from source 170 is trapped in passageways 180, 190 and in the lowering tubes 102. The lifting tubes 98 and passageway 192 are vented at port 195. When cylinder body 64 approaches the end of its travel to the right, for example, in its "front" position, lug 194 contacts abutment 198 and moves the control member in valve 184 to the right. When valve 184 is switched to the right, air supply passageway 180 is connected to lifting tube passageway 192, and to the lifting tubes 98. The lowering tubes 102 and lowering tube passageway 190 are connected to return passageway 182. Passageway 182 is connected to the exhaust port 195 by the valve 174.

Compressed air entering the lifting tubes 98 and exhausting from the lowering tubes 102 results in the lifting tubes 98 raising the holding slats. One of the holding slats 18 is shown to include a control arm 198 depending therefrom.

Valve 164 includes a control rod 200 extending outwardly from its control member and through an opening in control arm 198. Control rod 200 includes a pair of vertically-spaced abutments 202, 204. Abutment 202 is located below arm 198. Abutment 204 is located above arm 198. When holding slat 18 approaches its "up" position, arm 198 contacts abutment 204 and shifts valve 164 into its second position. When in its second position, valve 164 connects air supply passageway 168 with passageway 162 leading to air chamber 160. Air enters air chamber 160 and moves the control element of valve 144 into its second position, against the force of bias spring 158. When valve 144 is in its second position, oil is delivered from passageway 148 to passageway 152. Oil in passageway 150 is connected by valve 144 to return passageway 146. In response, oil in passageway 152 moves through passageway 116 into working chambers 130 and 124. Oil moves out of working chambers 126 and 132 into passageway 150 and then through valve 144 to return passageway 146. The cylinder body 64 moves to the left, for example, to its "rear" position. During this movement, the lifting tubes 98 hold the article(s) elevated above the conveyor slats. Cylinder body 64 moves the transverse drive beam and the conveyor slats back to a "start" position.

When cylinder body 64 moves away from abutment 198, bias spring 188 returns valve 184 to its center position, trapping air in the lifting tubes 98. When cylinder body 64 approaches its left end position, lug 194 contacts abutment 196 and moves the control element in valve 184 to its left position. This connects lifting tubes 98 and lifting tube passageway 192 to the atmosphere via valve 184, passageway 182, valve 174 and port 195. It also connects the air pressure source 170 to the lowering tubes 102 via passageway 172, valve 174, passageway 180, valve 184 and passageway 190.

Accordingly, it can be seen that the reciprocating floor conveyor of the present invention operates to convey articles, such as palletized loads or the like, as follows: with the holding slats in their "down" position, the conveyor slats support and convey the load as the conveyor slats move from their "start" to their "advanced" positions. After the conveyor slats reach their "advanced" positions, the holding slats are raised to their "up" position, thereby lifting the load off of the conveyor slats. The conveyor slats then retract in unison to their "start" positions, and the holding slats lower to redeposit the load onto the conveyor slats. The process then repeats to convey the load along the reciprocating floor conveyor. It should also be noted that the reciprocating floor conveyor of the present invention can operate to convey a load in either longitudinal direction, as was discussed in reference to FIG. 7.

The design of the described first embodiment of the reciprocating floor conveyor of the present invention is relatively simple due to the fact that the drive mechanisms are separate for the conveyor slats and the holding slats. Standard drive units control the reciprocating movement of the conveyor slats, and a lift mechanism with relatively few parts controls movement of the holding slats. As a result, manufacturing and maintenance costs are reduced.

FIGS. 8–17 illustrate alternative embodiments for the holding slat design shown in FIG. 6. These alternative embodiments are provided for illustrative purposes only, and are not exclusive of changes or modifications that can be made to the holding slat design of FIG. 6. FIGS. 8A, 8B illustrate a holding slat 18 and a pair of lowering tubes 102 similar to that shown in FIG. 6. The upper portion holding slat base 210 is modified to include a recessed channel 212 extending longitudinally along the holding slat base. A lifting tube 214 is positioned, at least partially, in channel 212. Lifting tube 214 includes a connection 216 for connection to an air supply tube 218. Connection 216 and air tube 218 can be positioned anywhere along the length of lifting tube 214. In FIG. 8A, lifting tube 214 is shown inflated and lowering tubes 102 are shown deflated, whereby holding slat 18 is raised above holding slat base 210 in its "up" position. In FIG. 8B, lifting tube 214 is deflated and lowering tubes 102 are inflated, whereby holding slat 18 is lowered onto holding slat base 210.

In FIGS. 9A, 9B, the holding slats 224 include bottom flanges 226 that have recessed channels 228. Holding slat base 230 includes upper lateral flanges 232 that overlie channels 228. A lifting tube 236 is positioned between the upper panel of holding slat 224 and the upper surface of holding slat base 230. A wave spring 238 is positioned in channels 228 beneath flanges 232. FIG. 9C provides a longitudinal sectional view of one of the wave springs 238. Spring 238 extends the length of the holding slat 224, and preferably, terminates inwardly of the ends of the holding slat 224. In FIG. 9A, lifting tube 236 is shown inflated, and holding slat 224 is shown in its raised position. Wave springs 228 are shown in compressed positions. In FIG. 9B, lifting tube 236 is deflated, and holding slat 224 is in its lowered position. Springs 238 are in their expanded positions. The spring constant for spring 238 is a function of the weight of the load to be carried by the holding slats.

In FIGS. 10A, 10B, the holding slat 240 remains essentially unchanged. However, the holding slat base 242 is substantially modified. Holding slat base 242 is comprised of a U-shaped channel beam 244 and a plastic bearing 246. Plastic bearing 246 includes inner pockets 248 formed between a central rib 250 and sidewalls 252. Sidewalls 252 each include an outwardly-facing groove 254 and lower flanges 256. The bottom flanges of holding slat 240 are captured in the outwardly-facing grooves 254. A single lifting tube 260 is provided in the space between U-shaped channel beam 244 and central rib 250 of plastic bearing 246. No lowering tubes are provided. The U-shaped channel beam 244 includes upper rails 262, which ride within pockets 248. In FIG. 10A, holding slat 240 is shown in a raised position due to lifting tube 260 being inflated. In FIG. 10B, holding slat 240 is shown in its lowered position due to lifting tube 260 being deflated. As can be seen in the figures, upper rails 262 of channel beam 244 move up and down within pockets 248 as holding slat 240 moves between its "up" and "down" positions. Channel beams 244 are secured to cross members, which form part of the support framework for the reciprocating floor conveyor.

In FIGS. 11A, 11B, a modified version of the holding slat base of FIGS. 10A, 10B is shown. The holding slat 240 remains unchanged. Holding slat base 270 includes an upwardly-facing U-shaped channel beam 272, which is secured at its bottom to cross members of the support framework. An inverted, or downwardly-facing U-shaped formed metal channel 274 rides on top of channel beam 272 and is held by plastic bearing 276, which overlies channel 274. Plastic bearing 276 includes ridges 278 for holding channel 274 and ridges 280 for grasping holding slat 240. A single lifting tube 282 is provided within the space between channels 272, 274. In FIG. 11A, lifting tube 282 is inflated and holding slat 240 is raised into its "up" position. In FIG. 11B, lifting tube 282 is deflated, and holding slat 242 is in its "down" position.

In FIGS. 12A, 12B, yet another modified version of a holding slat base 290 is shown. Holding slat base 290 includes a box beam 292 having an upper slot 294, which receives the central portion of a plunger 296. Plunger 296 includes an upper head 297 and a lower head 298 within box beam 292. A single lifting tube 300 is provided within box beam 292. Plunger 296 can be secured to the underside of the top panel of holding slat 240 so that the holding slat 240 and plunger 296 move as a single integral piece. In FIG. 12A, lifting tube 300 is shown inflated, and accordingly, holding slat 240 is in its "up" position. In FIG. 12B, lifting tube 300 is deflated, and holding slat 240 is in its "down" position. The lower head 298 of plunger 296 moves up and down within box beam 292 as holding slat 240 moves up and down.

In FIG. 13A, 13B, yet another modified version of holding slat base 304 is shown. Holding slat base 304 is comprised of a U-shaped channel beam 306 having outwardly-extending upper flanges 308. A T-shaped plastic bearing 310 is positioned within holding slat 240. Plastic bearing 310 includes a central portion 312 that slides within U-shaped channel beam 304. A lifting tube 314 is provided in the space between channel beam 304 and central portion 312 of plastic bearing 310. In this embodiment, a pair of lowering tubes 316 are provided between upper flanges 308 of channel beam 304 and the bottom flanges of holding slat 240. In FIG. 13A, holding slat 240 is in its "up" position, with lifting tube 314 inflated and lowering tubes 316 deflated. In FIG. 13B, holding slat 240 is in its "down" position, with lifting tube 314 deflated and lowering tubes 316 inflated.

In FIGS. 14A, 14B, both the holding slat and the holding slat base are modified. Holding slat 324 includes a downwardly-extending central portion 326, and wider sidewall portions that create shoulders 328. Holding slat base 330 includes upper flanges 332. The outer ends of upper flanges 332 engage shoulder portions 328 when holding slat 324 is in its "up" position, as shown in FIG. 14A. A single lifting tube 336 and a pair of lowering tubes 338 are provided. In FIG. 14A, holding slat 324 is shown in its "up" position, and in FIG. 14B, holding slat 324 is shown in its "down" position.

In FIGS. 15A, 15B, holding slat 340 includes a top panel 342, outer sidewalls 344, intermediate longer sidewalls 346, which include flanges 348, and a central wall 350, which includes a head 352. Holding slat base 354 is of a box-beam construction and includes enlarged sidewall portions 356, which form a shoulder for engaging flanges 348 of intermediate walls 346. A single lifting tube 360 is provided between head 352 and the lower section of holding slat base 354. A pair of lowering tubes 362 are provided between head 352 and the upper portions of holding slat base 354. FIG. 15A shows holding slat 342 in its raised position, and FIG. 15B shows holding slat 342 in its "down" position.

In FIGS. 16A, 16B, holding slat 370 is of an I-beam construction, and holding slat base 372 is of a box beam construction. A single lifting tube 374 and a pair of lowering tubes 376 are provided. FIG. 16A shows holding slat 370 in a raised position with lifting tube 374 expanded and lowering tubes 376 deflated, and FIG. 16B shows holding slat 370 in its "down" position with lowering tubes 376 inflated.

In FIGS. 17A, 17B, holding slat 380 is half an I-beam construction, and holding slat base 382 is a box beam with a slot formed at its upper left corner as shown in the figures. A single lifting tube 384 is provided for raising and lowering holding slat 380. FIG. 17A shows holding slat 380 in its "up" position, and FIG. 17B shows holding slat 380 in its "down" position.

Figure 18A:
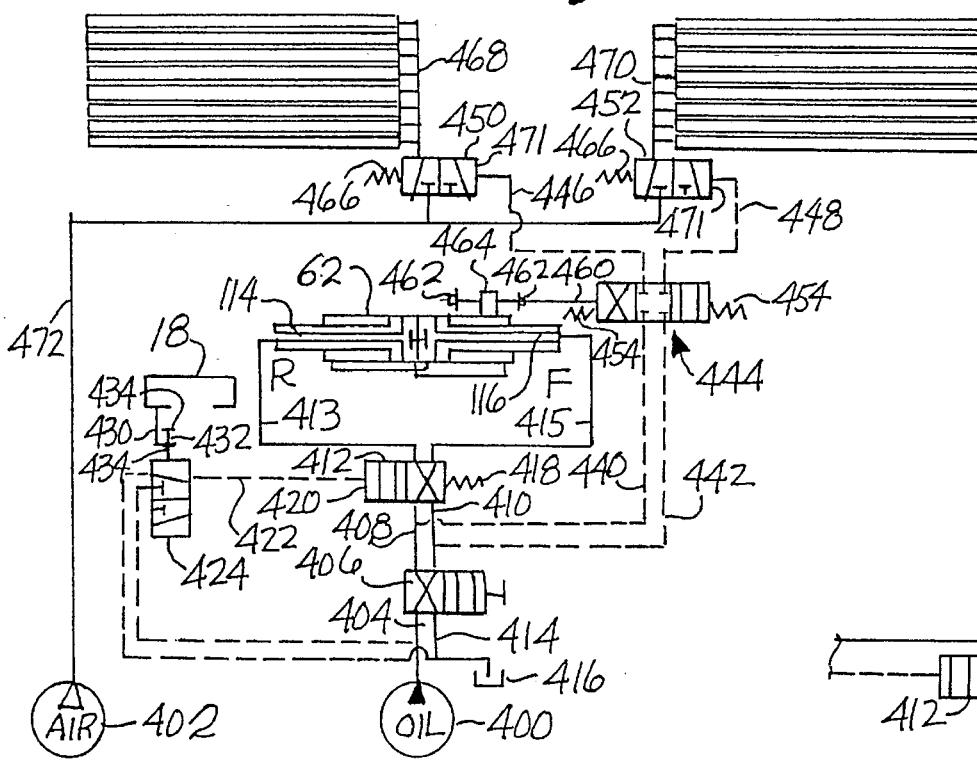
FIGS. 18A, 18B and 19 show schematic control diagrams for alternate embodiments for holding slat arrangements with both lifting and lowering tubes, as well as holding slat arrangements with only lifting tubes.
Figure 18B:
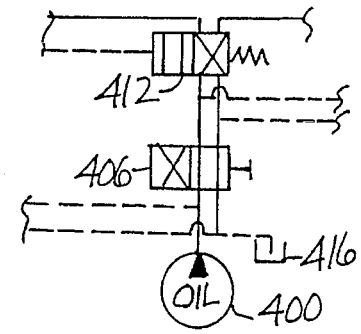
Figure 19:
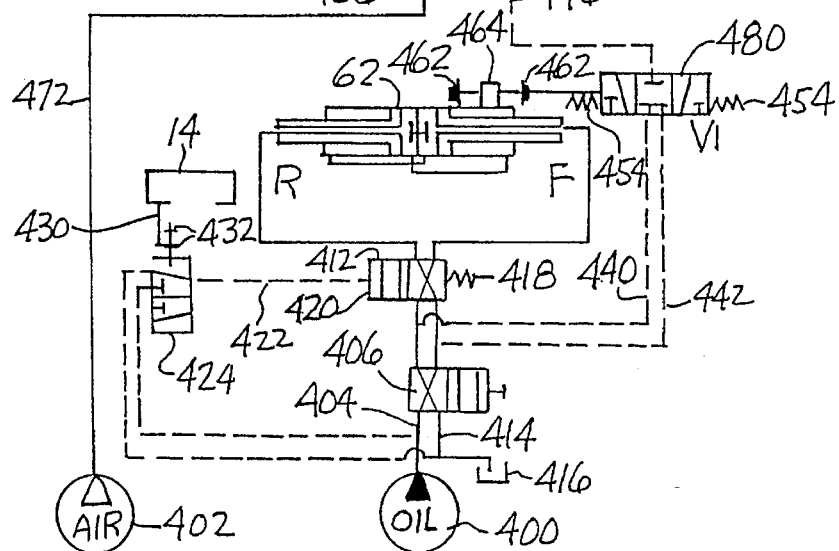

FIGS. 18–19 show schematic control diagrams for alternate embodiments of the holding slats, with FIGS. 18A, 18B directed to holding slat arrangements with both lifting and lowering tubes, and FIG. 19 being directed to a holding slat arrangement with only lifting tubes.

In FIG. 18A, actuator motor 62 is identical to that disclosed in FIG. 7. The oil source is designated 400 and the air source is designated 402. A passageway 404 leads from oil source 400 to a two-way valve 406. Valve 406 controls the conveying direction, i.e. "unload" or "load" direction. Passageways 408, 410 connect valve 406 to a two-position switching valve 412. A first passageway 413 extends from valve 412 to passageway 114 of actuator 62. A second passageway 415 extends from valve 412 to passageway 116 of actuator 62. Valve 412 switches pressure and return between passageways 413 and 415, and hence, between passageways 114, 116. Should more than one actuator motor 62 be used, the additional actuator motors would be connected in parallel between passageways 413 and 415. A passageway 414 leads from valve 406 back to tank 416. Passageways 413 and 415 and hence, passageways 114, 116, are at pressure or return depending upon the position of valve 412.

Valve 412 is biased by a spring 418 into a first of its two positions. An oil chamber 420 is provided at the end of valve 412 opposite spring 418 and is connected by a passageway 422 to valve 424. Valve 424 has two positions. In the position illustrated, valve 424 connects passageway 422 to tank 416. In the second position of valve 424, line 422 is connected to pressure from line 404.

A holding slat is designated at 18. Holding slat 18 has a control arm 430 depending downwardly from its bottom flange. Valve 424 includes a control rod 432 that extends through control arm 430, and includes a pair of spaced abutments 434. Up and down movement of holding slat 18 causes control arm 430 to engage abutments 434 and shift valve 424 between its two positions.

Passageways 440, 442 extend from passageways 408, 410, respectively, and lead to a three-position valve 444. Passageways 446, 448 lead from valve 444 to valves 450, 452. Valve 444 is shown in its neutral position, wherein passageways 440, 442 do not communicate with passageways 446, 448. A pair of springs 454 bias valve 444 into its neutral position. A control rod 460 extends from one end of valve 444 and includes a pair of spaced abutments 462. A lug 464 is mounted on the cylinder barrel of actuator 62, and control rod 460 extends through lug 464. Movement of the cylinder barrel of actuator 62 causes lug 464 to engage abutments 462 and move valve 444 into either its first or second positions, wherein communication is established between passageways 440, 442 and passageways 446, 448.

Valves 450, 452 each include a spring 466 for biasing the valves into a first position wherein manifolds 468, 470 are exhausted to atmosphere. Valves 450, 452 also include an oil chamber 471 at their ends opposite springs 466. Oil chambers 471 communicate with passageways 446, 448. An air supply passageway 472 supplies pressurized air to valves 450, 452. When in their second positions (not shown), valves 450, 452 connect air supply passageway 472 with manifolds 468, 470, thereby providing pressurized air to the tubes.

In operation, valve 406 is positioned in either is "load" or "unload" positions. Valve 406 is shown in its "load" position in FIG. 18A, and in its "unload" position in FIG. 18B. With valve 406 selected to load, oil pressure is delivered from source 400 through passageway 404 and passageway 410 to passageway 413 and passageway 114 of actuator 62. This causes the cylinder barrel of actuator 62 to move to the right as shown in the figure, and convey the load in that direction. When lug 464 on the cylinder barrel contacts the right abutment 462, valve 444 moves to the right and connects passageway 440 with passageway 448 and passageway 442 with passageway 446. Oil pressure moves through passageway 442 and passageway 446 to chamber 471 of valve 450, causing valve 450 to move to its second position. With valve 450 in its second position, air pressure is established through line 472 and manifold 468 into the lifting tubes.

Holding slat 18 is raised into its "up" position, which causes control arm 430 to engage the upper abutment 434 and shift valve 424 to its second position. In its second position, valve 424 connects passageway 422 with oil source 400. Oil pressure moves through line 422 into chamber 420 causing valve 412 to shift to its second position. In its second position, valve 412 connects passageway 408 with passageway 413 and passageway 410 with passageway 415. Oil pressure then moves into passageway 415 and passageway 116, causing the cylinder barrel of actuator 62 to move to the left. This movement retracts the conveying slats and causes lug 464 to engage the left abutment 462 and cause valve 444 to shift to its third position. In its third position, valve 444 connects passageway 440 with passageway 446 and passageway 442 with passageway 448. Oil pressure moves into passageway 442 and then into passageway 448 and into chamber 471 of valve 452. This causes valve 452 to shift to its second position, wherein air pressure is established into manifold 470 and into the lowering tubes. Passageway 446 is connected to tank 416, which causes oil pressure to move out of chamber 471 and cause valve 450 to return to its first position. In its first position, manifold 468 is connected to atmosphere, which causes the lifting tubes to exhaust.

When holding slat 18 reaches its "down" position, control arm 430 engages the lower abutment 434 and returns valve 424 to its first position. In its first position, passageway 424 is connected to tank. Oil pressure moves out of chamber 420, causing valve 412 to return to its first position, as shown in the figure. To convey in the "unload" direction, valve 406 is shifted to the left, as shown in FIG. 18B.

In FIG. 19, the control diagram for a holding slat arrangement with only a single set of lifting tubes is shown. This diagram is similar to the control diagram discussed with reference to FIGS. 18A, 18B, with a few modifications. Three-position valve 444 of FIG. 18A is replaced with a slightly different three-position valve 480. Valve 480 is shown in its neutral position wherein passageway 446 leading from valve 450 is not connected with either of passageways 440, 442 leading to pressure and return. In either of its second or third end positions, valve 480 connects passageway 446 with either passageway 440 or passageway 442, depending on valve 480's position. With these modifications, the operation of the control system essentially is unchanged.

Figure 20:
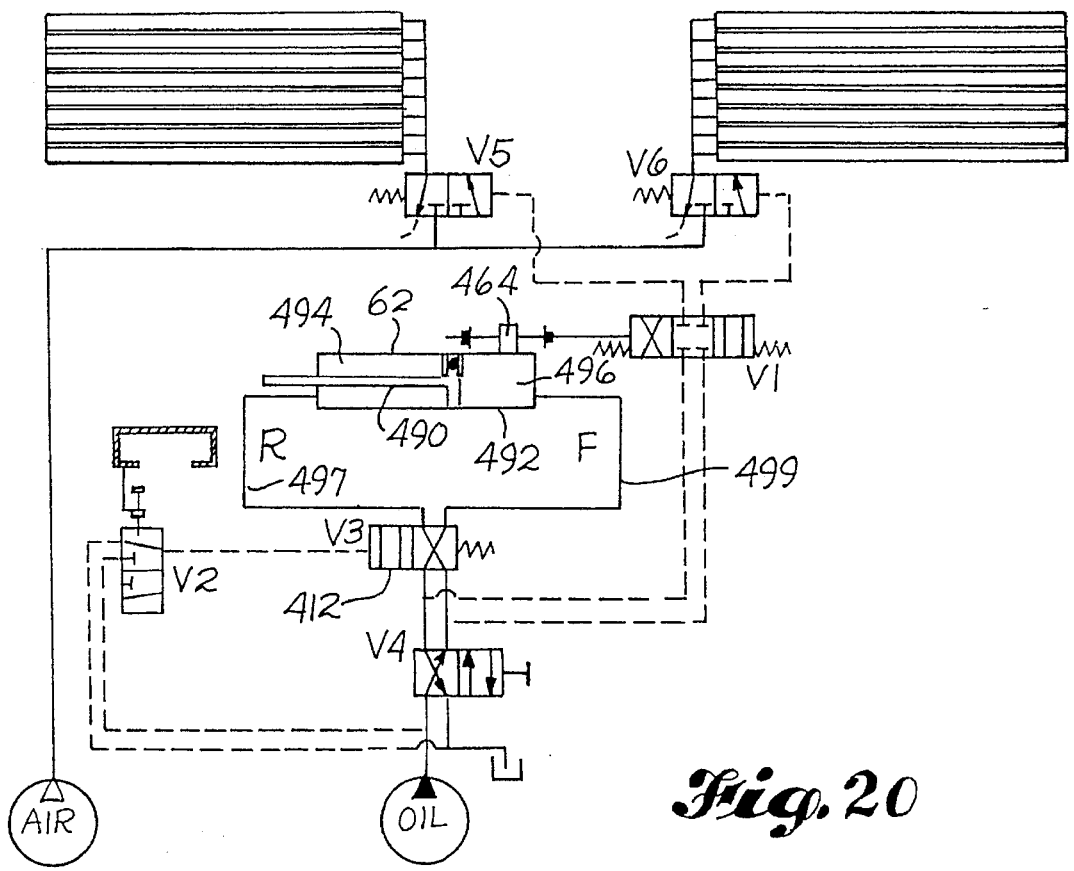
FIGS. 20 and 21 show schematic control diagrams similar to those of FIGS. 18, 19, with the hydraulic actuator in a slightly modified form.

In FIG. 20, the control diagram of FIG. 18A is modified to show an alternative embodiment for hydraulic actuator 62. As shown in FIG. 20, actuator 62 includes a single fixed piston rod and piston 490 and a cylinder barrel 492. Lug 464 is mounted on cylinder barrel 492. Piston 490 separates cylinder barrel 492 into a first chamber 494 and a second chamber 496. Passageway 497 connects chamber 494 with valve 412, and passageway 499 connects chamber 496 with valve 412. The operation of the rest of the control system remains unchanged.

Figure 21:
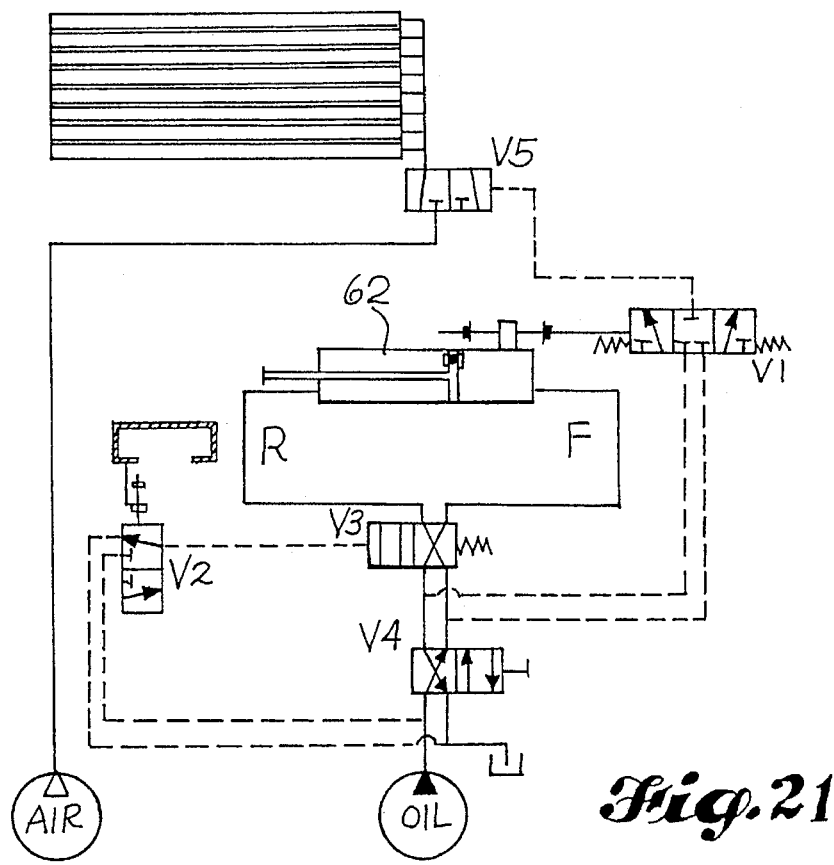

FIG. 21 shows the actuator 62 of FIG. 20 substituted for the actuator 62 in the control diagram of FIG. 19. The operation of the control system of FIG. 21 is similar to that of FIG. 19.

Figure 22:
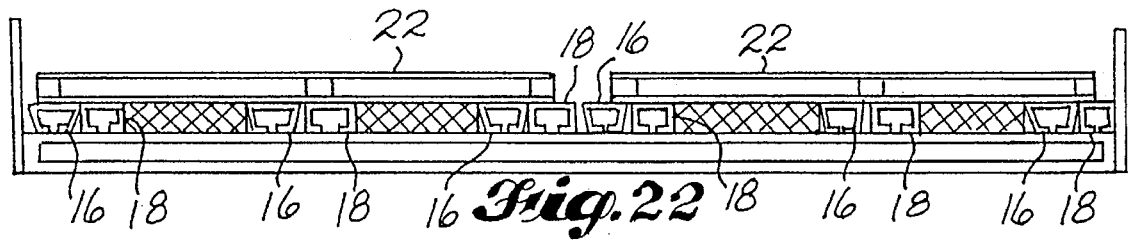
FIGS. 22–27 show alternate arrangements for positioning or arranging the conveyor slats and holding slats across the width of the conveyor floor.
Figure 23:
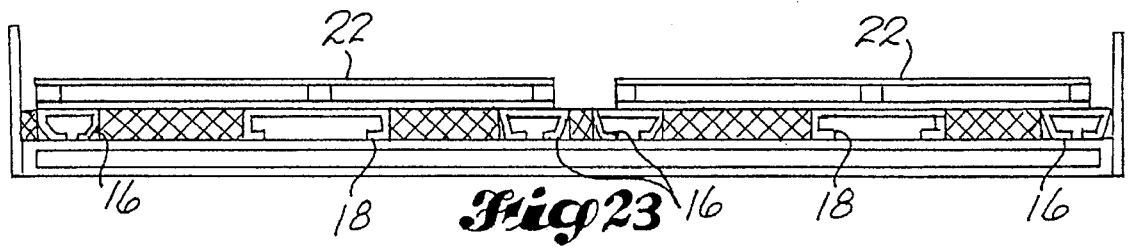
Figure 24:
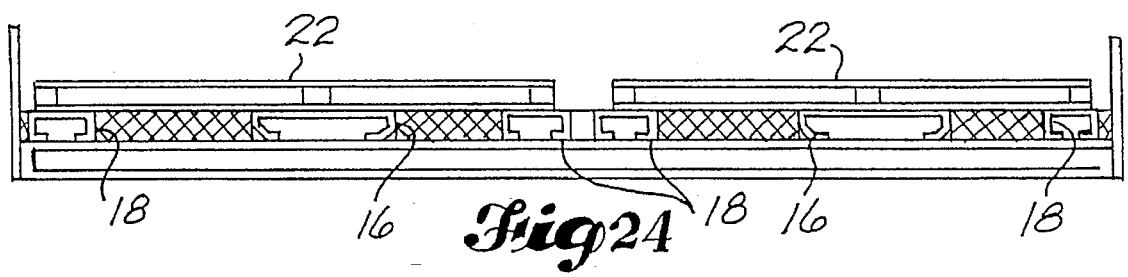
Figure 25:
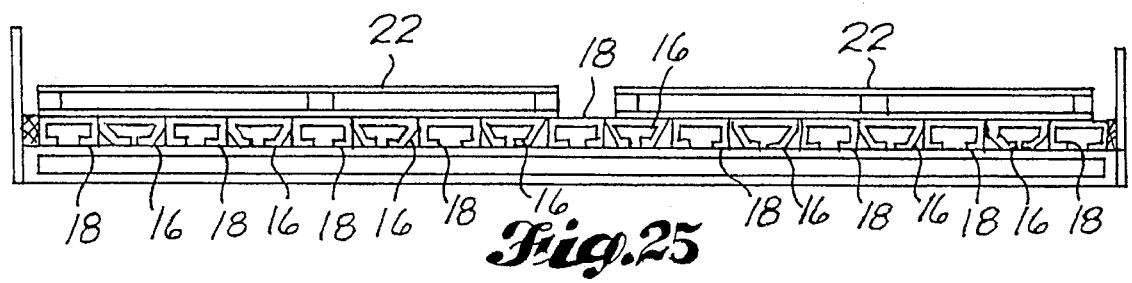
Figure 26:
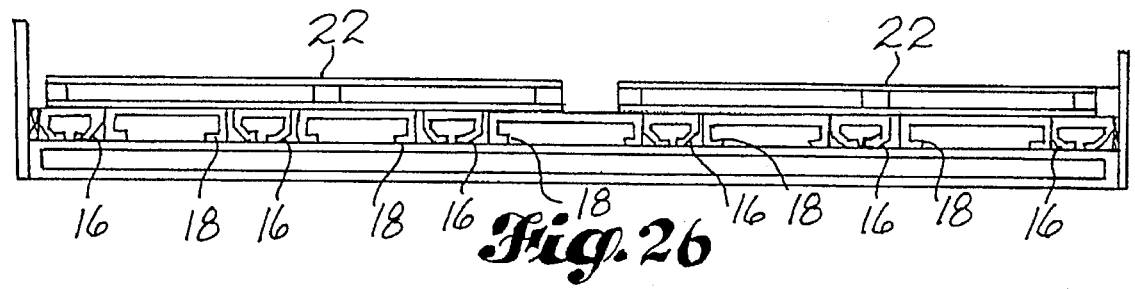
Figure 27:
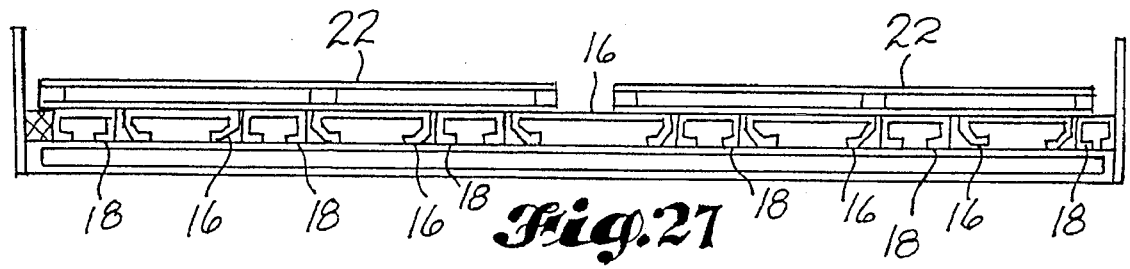

FIGS. 22–27 illustrate alternative embodiments for the arrangement of the conveyor slats 16 and holding slats 18. In FIG. 22, the arrangement of the conveyor slats and holding slats is designed to carry two pallets 22 in side-by-side relationship. For each pallet, a conveyor slat 16 and holding slat 18 are provided at the outer ends of the pallets 22 and at the central portion of the pallets 22. In FIG. 23, a conveying slat 16 is positioned at the outer ends of each pallet 22, and a wide holding slat 18 is positioned underneath the central portion of the pallets 22. In FIG. 24, the positions of the holding slats 18 and conveying slats 16 are switched from their positions as shown in FIG. 23. In FIG. 25, the conveying slats 16 and holding slats 18 are alternately positioned across the lateral expanse of the conveying floor. In FIG. 26, the conveying slats 16 and holding slats 18 are alternately positioned across the lateral expanse of the conveying floor, however, the holding slats 18 are twice the width of the conveying slats 16. In FIG. 27, the conveying slats 16 are twice the width of the holding slats 18, and the conveying slats 16 and holding slats 18 are alternately positioned across the conveying floor, as they are in FIG. 26.

Figure 28:
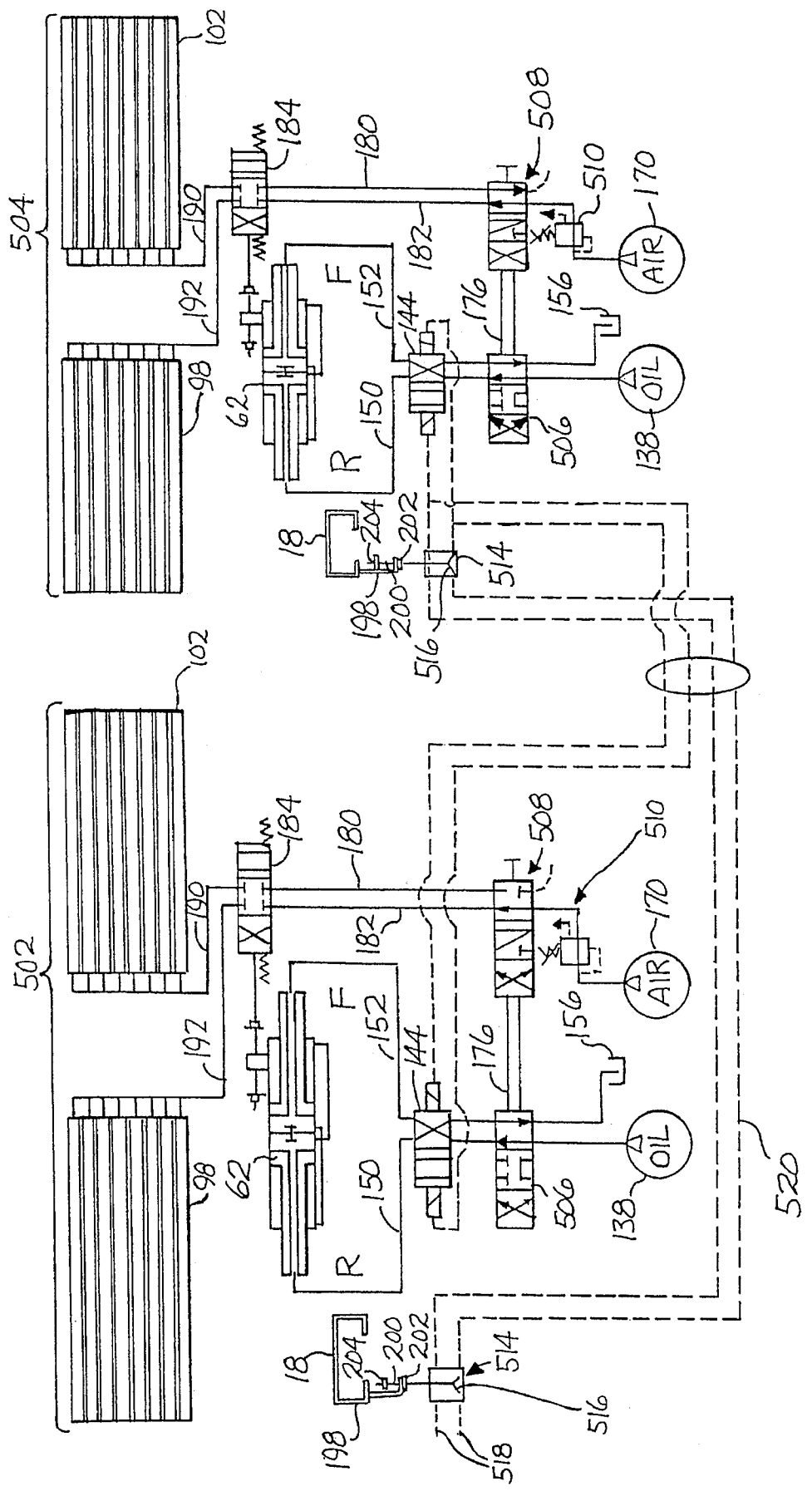
FIG. 28 is a schematic drawing of a control diagram for synchronized operation of two reciprocating floor conveyors positioned back to back.

In FIG. 28, a control diagram is illustrated for synchronized operation of two reciprocating floor conveyors positioned back to back. An example of such an application would be where one reciprocating floor conveyor of the present invention is installed in a mobile trailer, and a second reciprocating floor conveyor is installed at a stationary location, such as at a dock, where a trailer may pull up to and load or unload cargo. The dock portion of the control diagram is illustrated at 502, and the trailer portion of the control diagram is indicated at 504. Similar to the control diagram of FIG. 7, each control diagram portion 502, 504 includes lifting tubes 98 and lowering tubes 102, three-way position valve 184, passageways 190, 192 between valve 184 and the lifting and lowering tubes 98, 102, hydraulic motor 62, two-position valve 144, passageways 150, 152 between valve 144 and hydraulic motor 62, holding slat 18, including control arm 198 positioned between control rod 200 and abutments 202, 204, mechanical connection 176, oil source 138, tank 156, and air source 170. A three-position valve 506 is positioned between oil source 138 and two-position valve 144. A second, slightly different three-position valve 508 is positioned between air source 170 and three-way position valve 184. An air pressure regulator 510 is positioned between air source 170 and three-position valve 508. Valves 506, 508 are coupled together by connection 176. Passageways 180, 182 connect valve 184 to valve 508. Valves 506, 508 operate essentially as do valves 142, 174 of FIG. 7, except that each valve has a third intermediate position wherein fluid communication between oil source 138 and valve 144 is blocked and fluid communication between air source 170 and valve 184 is blocked and passageways 182, 180 are vented to atmosphere.

An electrical switch 514 replaces two-position valve 164 of FIG. 7. Control rod 200 is connected to electrical contacts 516. An electrical power source 518 is provided, and electrical switches 514 are mounted in series in circuit 520. Two-position valves 144 include electronic controls for shifting the movable component of valves 144 between the valves two positions. The electronic controls of valve 144 are mounted in parallel in circuit 520.

When holding slats 18 reach their high and low positions, wherein control rods 198 engage abutments 202, 204 and shift control rods 200, electrical contacts 516 are made, and when both electrical switches 514 have their contacts made, circuit 520 is established to the electronic controls of valve 144. At this time, valves 144 shift between positions, and hydraulic actuators 62 reverse their movement to reciprocate the movable slats in an opposite direction.

In this manner, the reciprocating floor conveyors of both a trailer reciprocating floor and a dock reciprocating floor can be synchronized to operate in tandem so that the holding slats of both floors rise and lower at the same time, and the movable slats reciprocate at the same time. This allows the palletized loads or the like to move across the transition area from one conveyor floor to the other in a controlled manner.

Figure 29:
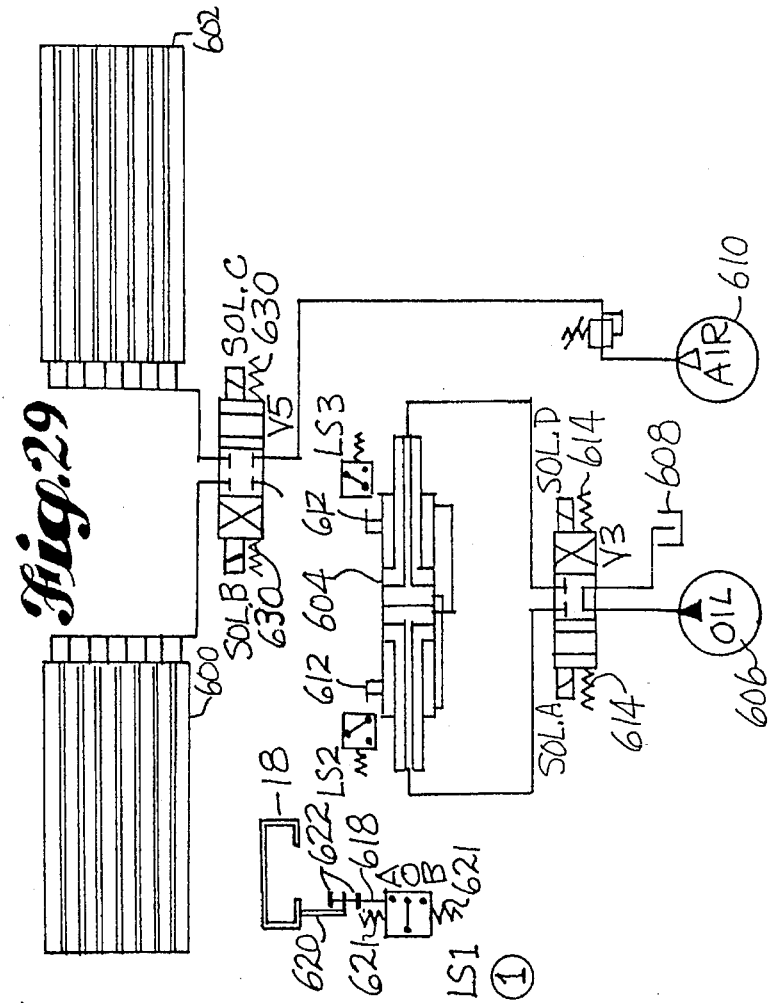
FIG. 29 is a schematic drawing of an alternative control system having electrical controls for the conveyor of FIGS. 1–6.

In FIG. 29, an alternative control system having electrical contact switches and solenoid controlled valves is shown to include lifting tubes 600, lowering tubes 602, movable cylinder unit 604, and a holding slat 18. An oil source 606, a tank 608, and an air pump 610 are also provided. Cylinder unit 604 includes front and rear fingers 612, which trip limit switches LS2, LS3 when cylinder unit 604 reaches either end of its travel.

A three-position, two-way valve V3 controls the flow of oil pressure between oil source 606, tank 608 and the "front" and "rear" fluid chambers of cylinder unit 604. A pair of centering springs 614 bias valve V3 in its center position, where pressure flow is blocked to cylinder unit 604. Solenoid SOL.A moves valve V3 to the left, as illustrated, connecting oil source 606 with the front fluid chamber, and solenoid SOL.D moves valve V3 to the right, connecting oil source 606 with the rear fluid chamber.

A three-position contact switch LS1 is operably connected to a control rod 618, which is moved between positions, "A", "O", and "B," by holding slat control arm 620. A pair of centering springs 621 bias switch LS1 in position "O." Lugs 622 on control rod 618 engage control arm 620 and move the contact lever of switch LS1 between positions "A" and "B."

A three-position, two-way valve V5 is positioned between air pump 610 and lifting and lowering tubes 600, 602. Valve V5 is biased in its center position by centering springs 630. Solenoid SOL.B moves valve V5 to the left, as illustrated, connecting air pump 610 with lifting tubes 600, and solenoid SOL.C moves valve V5 to the right, connecting air pump 610 with lowering tubes 602. In its center position, air flow between tubes 600, 602 and air pump 610 is blocked.

Figure 30:
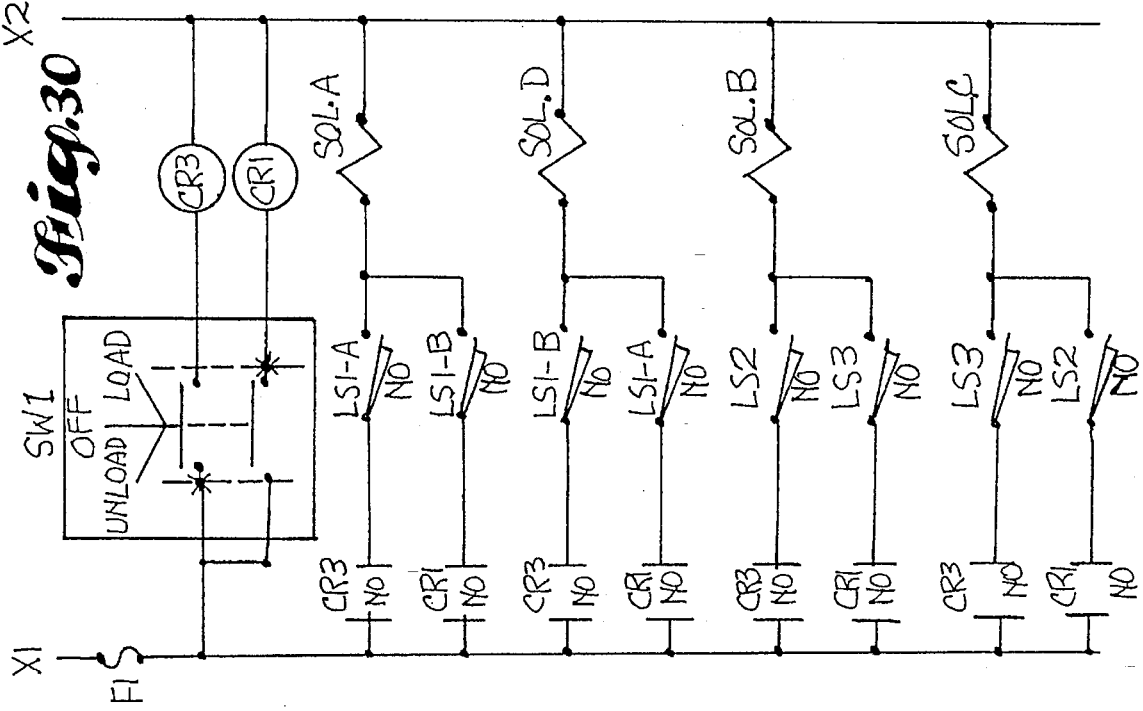
FIG. 30 is a circuit diagram for the control system of FIG. 29.

FIG. 30 illustrates a circuit diagram for the control system of FIG. 29. The circuit diagram includes an on/off switch SW1. Switch SW1 includes an "unload" position and a "load" position, as well as an "off" position. Contacts CR3 and CR1 are made by moving switch SW1 between "unload" and "load" positions, respectively. Each contact CR3 and CR1, when energized, closes four normally open contact switches, indicated by CR3-NO or CR1-NO. These contact switches are in series with solenoids SOL.A, SOL.D, SOL.B, and SOL.C. Switch LS1 has two normally open contacts LS1-A, LS1-B associated with positions "A" and "B." Contacts LS1-A, LS1-B are in parallel with each other and in series with solenoids SOL-A, SOL-D. Each contact switch LS2 and LS3 closes two normally open contacts that are in series with solenoids SOL-B, SOL-C.

When not in operation, contact switch LS1 is in its "B" position and contacts LS1-B are closed because holding slat 18 is lowered and control arm 620 holds control rod 618 down to keep switch LS1 in position "B." In operation, switch SW1 is moved from the "off" position either to the "load" or "unload" position, depending on which direction the conveyor is to be operated. If switch SW1 is moved to the "load" position, contact CR1 is made and switches CR1 close.

With contact switches CR1 and switch LS1-B closed, solenoid SOL.A moves valve V3 to the right connecting oil pressure to the "rear" fluid chamber of cylinder unit 604, moving cylinder unit 604 to the right. Front finger 612 engages limit switch LS3 at the end of travel of cylinder unit 604, which closes switches LS3 and energizes solenoid SOL.B. Valve V5 moves to the right, which connects lifting tubes 600 with air pump 610. Holding slats 18 rise, causing contact switch LS1 to switch from position "B" first to position "O," due to the centering forces of springs 621. In position "O," switches LS1-B open, de-energizing solenoid SOL.D, allowing centering springs 614 to return valve V3 to its center position. Switch LS1 moves to position "A" when holding slat 18 reaches its raised position and control arm 620 shifts control rod 618. Switches LS1-A close, which energizes solenoid SOL.D and moves valve V3 to the left, connecting oil pressure with the front fluid chamber of cylinder unit 604.

Cylinder unit 604 reciprocates to the left until rear finger 612 trips limit switch LS2. When switch LS2 closes, solenoid SOL.C is energized, connecting air pump 610 with lowering tubes 602. Holding slats 18 lower. Switch LS1 moves to position "O," which opens contact LS1-A, de-energizing solenoid SOL.C and returning valve V3 to its center position. Switch LS1 then moves to position "B," which closes switches LS1-B and energizes solenoid SOL.A. The cycle continues, reciprocating the conveyor slats and raising and lowering the holding slats to convey a load in a "load" direction. The "unload" direction works in a similar, reverse manner.

In FIG. 31, a slightly modified control system is shown. The control system of FIGS. 29, 30 utilized the center position of switch LS1 to move valve V3 to its center position, in which oil pressure is blocked to cylinder unit 604. Blocking oil pressure to cylinder unit 604 reduces wear and tear on the cylinder unit. The system of FIG. 31 utilizes a single spring switch LS1, which biases switch LS1 into one of its two positions, and an extra set of normally closed limit switches LS2, LS3. As shown in FIG. 32, the limit switches LS2, LS3 in series with solenoids SOL.A, SOL.D are normally closed, while the switches LS2, LS3 in series with solenoids SOL.B, SOL.C are normally open.

In operation, switch SW1 closes switch CR1, which closes contacts CR1. Switches LS1-B are closed. Solenoid SOL.A is energized, valve V3 is moved right and oil pressure is delivered to the rear fluid chamber on cylinder unit 604. Limit switch LS3 is switched when cylinder unit 604 reaches the end of its travel. Switch LS3 in series with solenoid SOL.A opens, and switch LS3 in series with solenoid SOL.B closes, energizing solenoid SOL.B. Valve V5 moves right, connecting air pump 610 to lifting tubes 600. Switch LS1 moves to position "A" when holding slat 18 is raised. Switches LS1-A close, energizing solenoid SOL.D. Valve V3 moves left, and oil pressure is delivered to front fluid chamber. Cylinder unit 604 moves left until limit switch LS2 is switched. Switches LS2 open and close, respectively, energizing solenoid SOL.C and de-energizing solenoid SOL.D. Air is connected to lowering tubes 602, and holding slats 18 then lower. Switch LS1 returns to position LS1-B, and the cycle repeats to operate the conveyor.

In FIG. 33, an alternative hydraulic lifting mechanism 700 is illustrated. Hydraulic lifting mechanism 700 replaces the pneumatic lifting and lowering tubes shown in FIG. 6. Holding slats 710 are slightly modified to include a top plate 712 and two downward depending side walls 714, each having a lower flange 716. A floor sub channel 720 supports each holding slat 710. Each floor sub channel 720 includes a base 722 and a pair of upstanding side walls 724, each having an upper flange 726. Bolts 730 secure floor sub channels 720 to cross beams (not shown) of the conveyor frame. Elongated floor bearings 734 ride on side walls 724 of floor sub channels 720.

Hydraulic lifting mechanism 700 is generally a piston assembly comprising a cylinder upper half 740 and a cylinder lower half 742. These cylinder halves are threaded together and include a suitable seal 744. A piston rod 750 and piston 752 are slidable within cylinder halves 740, 742. Piston 752 includes a seal 754 for sealing between upper chamber 756 and lower chamber 758 defined by cylinder halves 740, 742 and piston 752. Ports 760 lead to upper chamber 756, and ports 762 lead to lower chamber 758. Piston rod 750 is mounted to upper cylinder half 740 by ring 766.

FIG. 35 shows piston assembly 700 is shown mounted to floor sub channel 720 and cross beams 770. The holding slats are not shown in this figure. Hydraulic connecting tubes 772 link ports 760 with each other so as to allow piston rods 750 and pistons 752 to raise and lower in unison to raise and lower a holding slat. A similar hydraulic connecting tube (not shown) links ports 762.

In FIGS. 36 and 37, both connecting tubes are shown, with tube 772 linking ports 760 and tube 774 linking ports 762. A switching valve 780 is provided to control the direction of hydraulic pressure into and out of the piston assemblies 710. The last piston assembly 710' includes only one port 760 and one port 762. Also, a rear stop 790 is provided adjacent one end of holding slat 700 to prevent material from getting underneath the holding slats.

FIG. 38 shows a control diagram for the conveyor illustrated in FIGS. 33–37. The control diagram is shown to include three hydraulic cylinders 800, 801, 802. As discussed previously, the present invention is not limited in any sense to the number of hydraulic cylinders used—there could be one hydraulic cylinder per conveyor slat, or there could be one hydraulic cylinder for the entire conveyor. In the illustrated case, there are three hydraulic cylinders, which are all three connected to a single transverse drive beam linking the cylinders to the conveyor slats.

The fluid chambers 805, 806, 807 of hydraulic cylinders 801, 802, 803 communicate with each other via connections 810, 811, 812, 813. Fluid chambers 815, 816, 817 communicate via connections 821, 822, 823, 824. Connections 813 and 823 lead from a two-way switching valve 826, which controls the path of fluid pressure from pressure port P and tank T. Ball valve 828 is provided between lines P and T. Pressure lines 830, 831 lead from switching valve 826 to a control valve 834, which is used to control the sequence of slat movement, and in turn the direction that the load is conveyed. Pressure lines 836, 837 lead from control valve 834 to the linked hydraulics of the holding slat piston assemblies 710. Switching valve 826 is mechanically coupled to at least one of the holding slats to effect the switching of valve 826 between its two positions. The mechanical coupling being similar to that discussed with reference to earlier embodiments.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalence and reversal of parts.

What is claimed is:

1. A reciprocating floor conveyor for conveying articles having fixed-form wide bases, comprising:

a support frame;

a plurality of laterally spaced-apart conveyor slats mounted on the support frame for longitudinal reciprocation between a start position and an advanced position, the conveyor slats having upper surface portions with a constant vertical height that defines a horizontal conveying plane;

a plurality of laterally spaced-apart holding slats mounted on the frame for vertical movement between an up position in which the upper surfaces of the holding slats are above the conveying plane defined by the conveyor slats and the articles are supported by the holding slats, and a down position in which the upper surfaces of the holding slats are below the conveying plane and the articles are supported by the conveyor slats; each holding slat including a top, two laterally spaced sides extending downwardly from the top, and two bottom flanges, one extending laterally from a bottom portion of each side;

the conveyor slats and the holding slats being distributed across the conveyor in a pattern resulting in both conveyor slats and holding slats being below each article on the conveyor;

a holding slat base for each holding slat, each holding slat base having opposite laterally extending flanges positioned between the bottom flanges and the top of the corresponding holding slat to limit vertical movement of the holding slat; wherein a collapsible pocket is formed vertically between the holding slat and its base; and an expandable member located in each collapsible pocket, wherein expansion of the expandable members raises the holding slats from their down position to their up position to lift any articles on the conveyor up off the conveyor slats to permit the conveyor slats to be retracted from their advanced position to their start position while the conveyor slats are out of contact with the articles.

2. The reciprocating floor conveyor of claim 1, wherein the conveyor slats are mounted on the support frame for longitudinal reciprocation in a manner so that the movement of the conveyor slats is restricted to longitudinal reciprocation.

3. The reciprocating floor conveyor of claim 1, wherein the movement of the holding slats is restricted to vertical movement.

4. A reciprocating floor conveyor for conveying articles having fixed-form wide bases, comprising;

a support frame;

a plurality of laterally spaced-apart conveyor slats mounted on the support frame for longitudinal reciprocation between "start" and "advanced" positions;

a plurality of laterally spaced-apart holding slats mounted on the frame for vertical movement between an "up" position in which the holding slats are above the conveyor slats, and a "down" position in which the articles are supported by the conveyor slats;

the conveyor slats and the holding slats being distributed across the conveyor in a pattern resulting in both conveyor slats and holding slats being below each article on the conveyor;

means for moving the conveyor slats and any article on them from the "start" position to the "advanced" position, when the holding slats are in their "down" position, for conveying the articles, and for retracting the conveyor slats, when the holding slats are in their "up" position and are holding the articles up off the conveyor slats; and a holding slat base for each holding slat and an expandable member between each holding slat and its holding slat base, wherein expansion of the expandable members moves the holding slats from their "down" position to their "up" position;

wherein between each holding slat and its holding slat base is formed a collapsible pocket in which the expandable member is located;

wherein each collapsible pocket is formed by an upper surface of the holding slat base and the under surface of the holding slat, with the under surface extending above the upper surface of the holding slat base and downwardly past the edges of the upper surface; and wherein each holding slat base includes a flat upper surface with lateral flanges extending transversely to the holding slat base, and each holding slat includes a top, two sides extending downwardly from the lateral edges of the top, and two bottom flanges, one extending inwardly from the bottom edge of each side, the lateral flanges of the holding slat bases being situated between the top and bottom flanges of the holding slats.

5. The reciprocating floor conveyor of claim 4, and further comprising additional expandable members located between the lateral flanges of each holding slat base and the bottom flanges of each holding slat, one additional expandable member located on each side of each holding slat base, whereby expansion of the additional expandable members causes the holding slats to move from their "up" position to their "down" position.

6. The reciprocating floor conveyor of claim 1, further comprising a transverse drive beam coupled to each conveyor slat and a drive unit for reciprocating the transverse drive beam.

7. The reciprocating floor conveyor of claim 6, wherein the drive unit includes a hydraulic actuator motor.

8. The reciprocating floor conveyor of claim 7, wherein the hydraulic actuator motor includes a pair of fixed, spaced-apart piston/piston rod units and a movable cylinder unit mounted for reciprocating movement on the pistons, the transverse drive beam being mounted to the cylinder unit.

9. The reciprocating floor conveyor of claim 1, and further comprising a plurality of divider planks interspersed on the support frame between some of the conveyor slats.

10. The reciprocating floor conveyor of claim 1, further comprising a first control arm extending downwardly from one of the holding slats and a second control arm adjacent the first control arm, one of said control arms including a pair of spaced abutments positioned to contact the other control arm, the first control arm being adapted to shift the second control arm between a first position and a second position as the holding slat moves between its up and down positions.

11. The reciprocating floor conveyor of claim 10, further comprising a control system for controlling operation of the reciprocating floor conveyor, the control system including a valve coupled to the second control arm, the control system adapted to reverse movement of the conveyor slats in response to movement of the second control arm.

12. The reciprocating floor conveyor of claim 1, wherein the holding slat base includes a recessed longitudinal channel, and the expandable member is positioned, at least partially, within the longitudinal channel.

13. The reciprocating floor conveyor of claim 1, wherein the holding slat base includes a U-shaped channel beam with outwardly-extending rails, and the holding slat includes a main portion and a bearing for supporting the main portion, the bearing including a pair of pockets in which the outwardly-extending rails are received for up and down movement.

14. The reciprocating floor conveyor of claim 13, wherein the expandable member is positioned within the U-shaped channel beam and under the bearing.

15. The reciprocating floor conveyor of claim 1, wherein the holding slat base includes a U-shaped channel beam with outwardly-extending upper flanges, and the holding slat includes a main portion and a bearing having a central portion adapted to slide up and down within the U-shaped channel beam, the bearing adapted to support the main portion of the holding slat, the expandable member being positioned between the central portion of the bearing and the U-shaped channel beam.

16. The reciprocating floor conveyor of claim 1, wherein the holding slat includes a downwardly-extending central portion and the holding slat base includes a U-shaped channel beam into which the central portion of the holding slat extends, the expandable member being positioned between the central portion of the holding slat and the U-shaped channel beam.

17. The reciprocating floor conveyor of claim 1, wherein the holding slat includes a downwardly-depending central wall intermediate the laterally spaced sides, the central wall including a head, and wherein the holding slat base includes a box beam, and the central wall extends into the box beam, the box beam having outer shoulders adapted to engage the bottom flanges of the holding slat and limit upward movement of the holding slat.

18. An apparatus (of claim 28,) for raising and lowering an article supported thereon, comprising:

a base having an upper surface and opposite laterally extending flanges;

a slat member carried on the base and having a top, two laterally spaced sides depending downwardly from the top, and two bottom flanges, one extending laterally from a bottom portion of each side, the flanges of the base being positioned between the bottom flanges and the top of the slat member to limit vertical movement of the slat member, wherein a collapsible pocket is formed vertically between the slat member and the base;

an expandable lift member sandwiched between the base and the slat member in the collapsible pocket; whereby, with article supported on the slat member, expansion of the lift member moves the top of the slat member away from the base, thereby raising the article, and contraction of the lift member allows the top to move toward the base, thereby lowering the article; and a pair of expandable lowering members, each located between a bottom flange of the slat member and a laterally extending flange of the base, whereby expansion of the pair of expandable lowering members and contraction of the lift member causes the slat member to move toward the base, and contraction of the expandable lowering members and expansion of the lift member causes the slat member to move away from the base.

19. The conveyor of claim 1, in which the sides of the holding slat provide lateral support for the expandable member.

20. The conveyor of claim 1, in which the bottom flanges of the holding slat extend laterally inwardly toward each other, and the flanges on the holding slat base extend outwardly in opposite lateral directions.

* * * * *

UNITED STATES PATENT AND TRADEMARK OFFICE
CERTIFICATE OF CORRECTION

PATENT NO: 5,588,522

DATED: December 31, 1996

INVENTOR(S): Raymond K. Foster and Randall M. Foster

It is certified that error appears in the above-identified patent and that said Letters Patent are hereby corrected as shown below:

On the cover, Section [56], "References Cited - U.S. PATENT DOCUMENTS",
insert -- 3,958,701    05/976    Yatagai et al. --.

Claim 16, column 19, line 24, there is a comma after "portion".

Claim 18, column 20, line 15 (14th line of text), after "with", insert -- the --.

Signed and Sealed this

Twenty-third Day of September, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,588,522

DATED : December 31, 1996

INVENTOR(S) : Raymond K. Foster and Randall M. Foster

It is certified that error appears in the above-indentified patent and that said Letters Patent is hereby corrected as shown below:

Column 19, line 37, delete "(of claim 28,)".

Signed and Sealed this

Twenty-eighth Day of October, 1997

Attest:

BRUCE LEHMAN

Attesting Officer

Commissioner of Patents and Trademarks